(12) United States Patent
Leister et al.

(10) Patent No.: US 12,292,646 B2
(45) Date of Patent: May 6, 2025

(54) LIGHT MODULATION DEVICE HAVING HIGH LIGHT EFFICIENCY

(71) Applicant: SEEREAL TECHNOLOGIES S.A., Munsbach (LU)

(72) Inventors: Norbert Leister, Dresden Sachsen (DE); Bo Kroll, London (GB)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 0 days.

(21) Appl. No.: 17/787,495

(22) PCT Filed: Dec. 17, 2020

(86) PCT No.: PCT/EP2020/086762
§ 371 (c)(1),
(2) Date: Jun. 20, 2022

(87) PCT Pub. No.: WO2021/122988
PCT Pub. Date: Jun. 24, 2021

(65) Prior Publication Data
US 2023/0024541 A1    Jan. 26, 2023

(30) Foreign Application Priority Data
Dec. 20, 2019  (EP) ..................................... 19219151

(51) Int. Cl.
*G02F 1/1335* (2006.01)
*G02F 1/13363* (2006.01)
(Continued)

(52) U.S. Cl.
CPC .. *G02F 1/133555* (2013.01); *G02F 1/133553* (2013.01); *G02F 1/133638* (2021.01);
(Continued)

(58) Field of Classification Search
CPC ......... G02F 1/133555; G02F 1/136286; G02F 2201/40; G02F 1/133638; G02F 1/133536;
(Continued)

(56) References Cited

U.S. PATENT DOCUMENTS

2007/0242196 A1   10/2007   Yoshida et al.
2012/0092735 A1   4/2012    Futterer et al.
(Continued)

OTHER PUBLICATIONS

International Search Report, dated Apr. 23, 2021, and Written Opinion issued in International Application No. PCT/EP2020/086762.

*Primary Examiner* — Paisley L Wilson
(74) *Attorney, Agent, or Firm* — Saul Ewing LLP

(57) ABSTRACT

The invention relates to a light modulation device having pixels. Essentially, the one half of the pixels are reflective and the other half of the pixels are transmissive. The reflective pixels are arranged in alternation with the transmissive pixels in the same substrate plane. The light modulation device also has a backplane, which has transistors and data lines for conducting signals to the pixels. Each pixel is assigned at least one transistor and at least two data lines. The transistors and the data lines of each adjacent pair of a reflective pixel and a transmissive pixel are arranged under the reflective pixel.

31 Claims, 13 Drawing Sheets

(51) Int. Cl.
    *G02F 1/1337*     (2006.01)
    *G02F 1/1347*     (2006.01)
    *G02F 1/1362*     (2006.01)
    *G03H 1/22*     (2006.01)

(52) U.S. Cl.
    CPC .... *G02F 1/133757* (2021.01); *G02F 1/13471* (2013.01); *G02F 1/136286* (2013.01); *G03H 1/2294* (2013.01); *G02F 1/133512* (2013.01); *G02F 1/133514* (2013.01); *G02F 1/133526* (2013.01); *G02F 1/133536* (2013.01); *G02F 1/133548* (2021.01); *G02F 2201/40* (2013.01); *G03H 2225/33* (2013.01)

(58) Field of Classification Search
    CPC ........ G02F 1/133548; G02F 1/133757; G03H 1/2294; G03H 2225/33
    See application file for complete search history.

(56) References Cited

U.S. PATENT DOCUMENTS

| | | | |
|---|---|---|---|
| 2013/0250224 A1* | 9/2013 | Huo | G02F 1/13624 |
| | | | 349/143 |
| 2016/0327906 A1 | 11/2016 | Futterer | |
| 2020/0333703 A1* | 10/2020 | Hu | G03F 7/0002 |

* cited by examiner

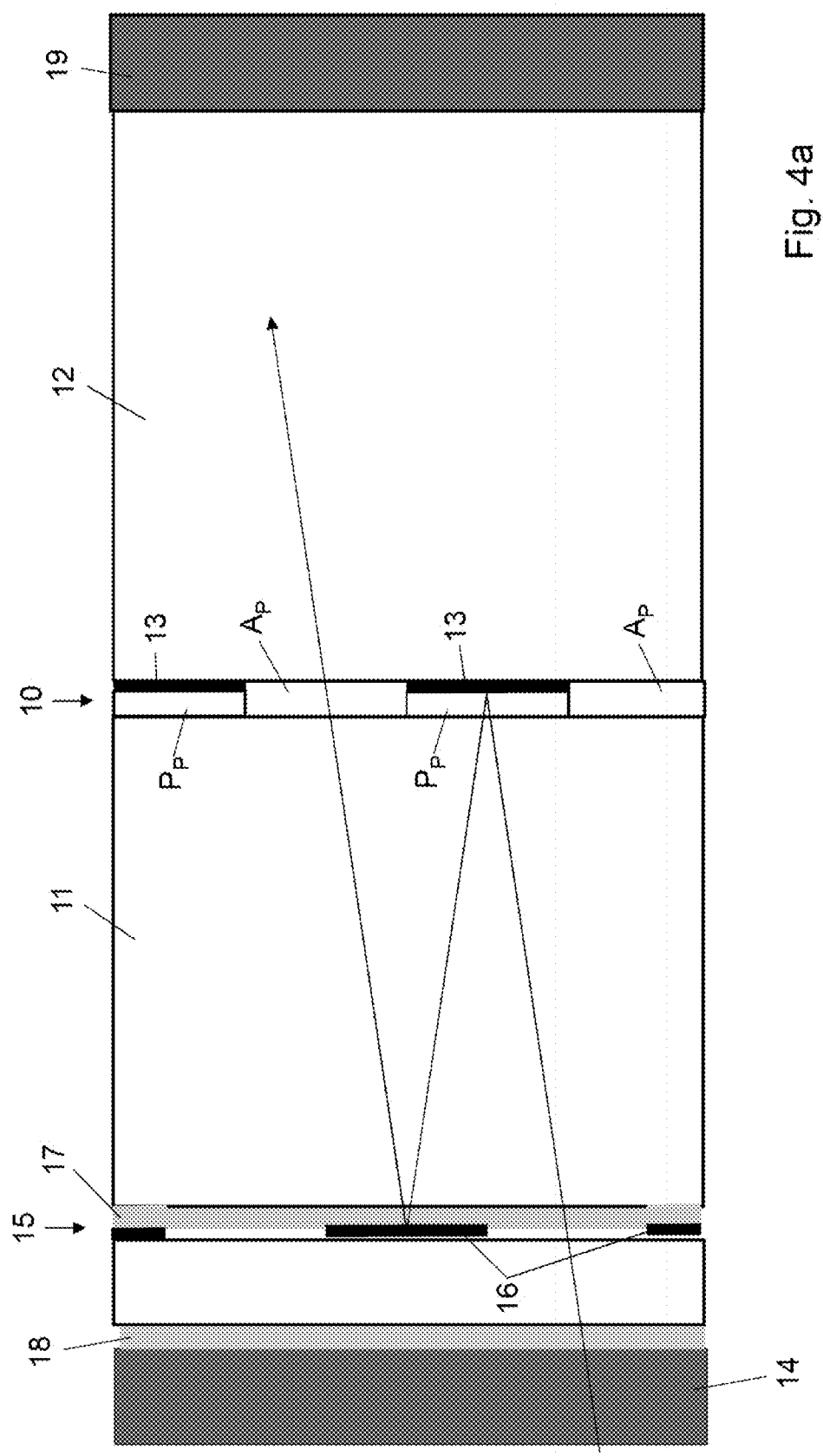

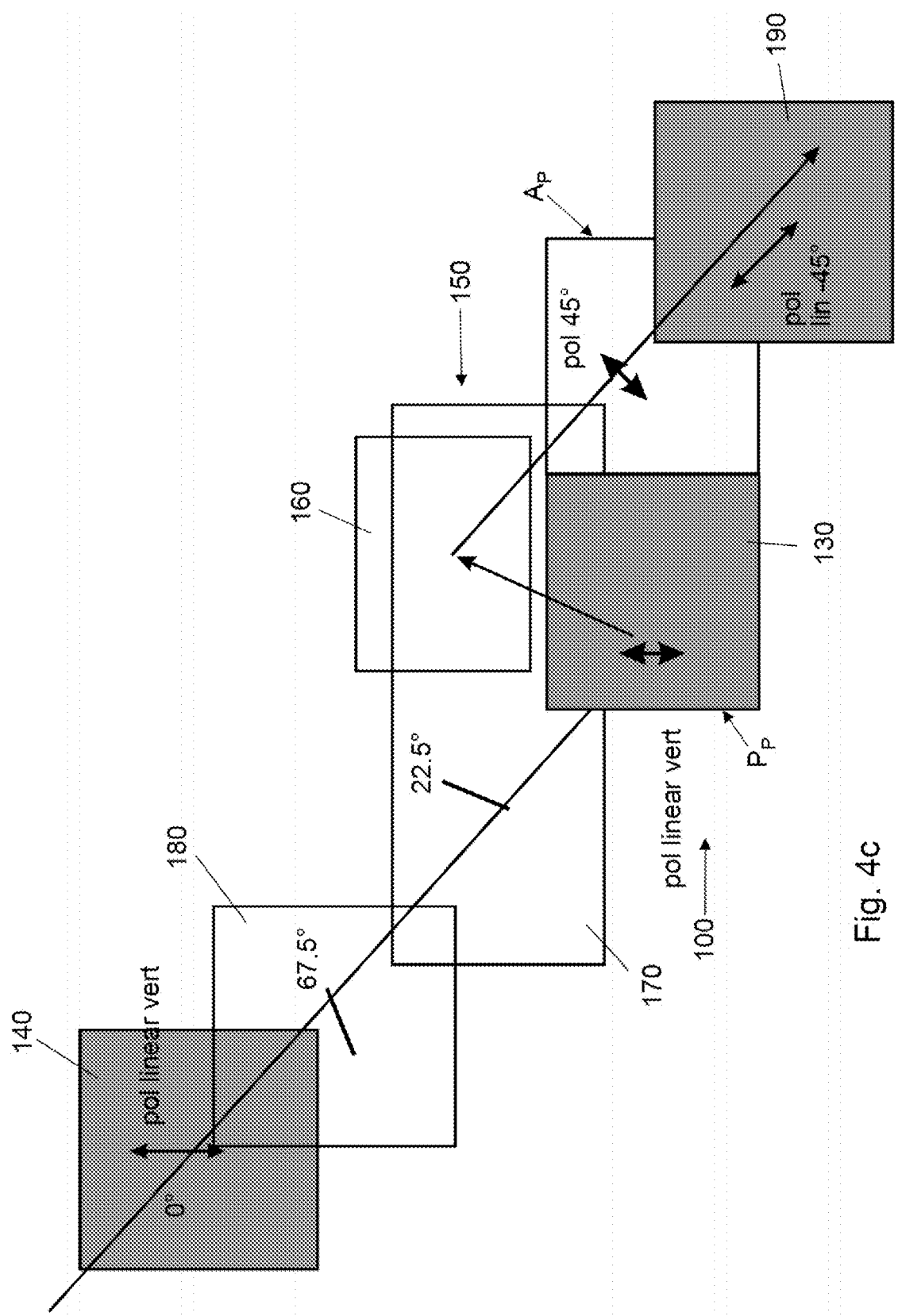

Fig. 7: Prior art

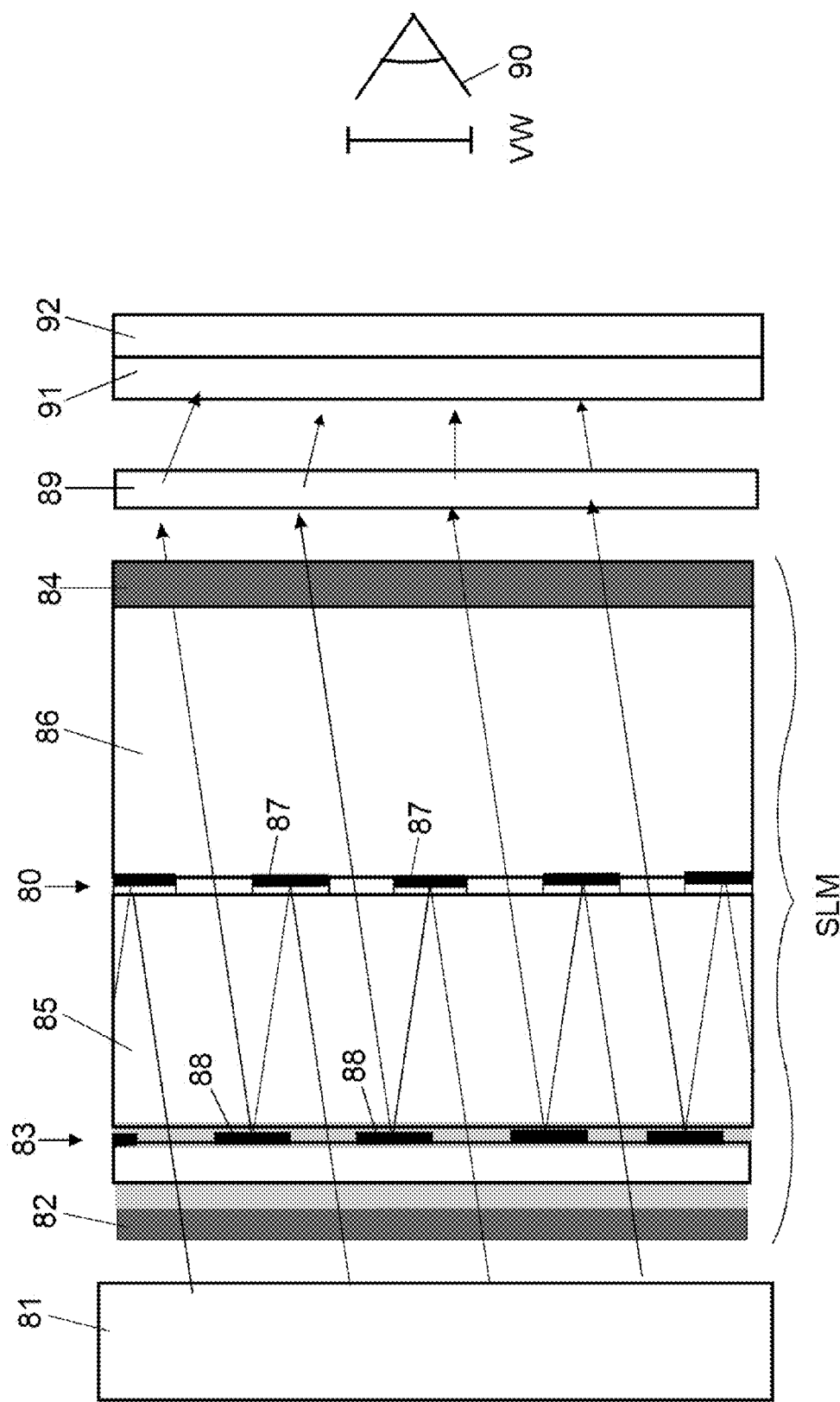

LIGHT MODULATION DEVICE HAVING HIGH LIGHT EFFICIENCY

CROSS REFERENCE TO RELATED APPLICATIONS

This application claims the priority of PCT/EP2020/086762, filed on Dec. 17, 2020, which claims priority to European Application No. EP 19219151.8, filed on Dec. 20, 2019, the entire contents of each of which are incorporated fully herein by reference.

BACKGROUND OF THE INVENTION

The present invention relates to a light modulation device which can be used in a display device for the holographic reconstruction of objects or scenes. In particular, the present invention relates to a spatial light modulation device in which in particular a planar combination of mutually adjoining modulation elements or pixels is used. The use of such light modulation devices in display devices might principally be able to be found in mobile applications such as smartphones and tablet computers. However, other applications, such as e.g. monitors or televisions, are likewise possible.

Furthermore, the present invention also relates to a display device, in particular a holographic display device, which comprises such a spatial light modulation device according to the invention. The display device is provided for generating a two-dimensional and/or three-dimensional representation of a scene or of a content or object.

The present spatial light modulation device and also the display device are configured in such a way that they can generate and display or represent two-dimensional (2D) and/or three-dimensional (3D) images. It goes without saying that two-dimensional images or three-dimensional images also comprise two-dimensional or three-dimensional contents or films.

Direct view displays, projection displays such as, for example, head-mounted displays (HMDs) but also head-up displays (HUDs) for a preferably three-dimensional representation of holographic images/contents may be regarded as fields of application of the present invention.

Flat displays having a screen with a thickness of several centimeters or less are used nowadays mainly in monitors for notebooks, laptops, cellular phones or else in vehicle or aircraft cockpits.

Holograms are encoded or written in spatial light modulation devices. Such holograms may generally have complex-valued data. By contrast, spatial light modulation devices often have only a phase modulation or an amplitude modulation of incident light, are thus designed as a phase modulator or an amplitude modulator and thus do not allow independent modulation of the phase and amplitude of the incident light.

Known hologram encoding methods therefore use for example a plurality of pixels of a spatial light modulation device or a combination of two spatial light modulation devices, a phase modulator and an amplitude modulator, in order to represent a complex value composed of amplitude and phase.

US 2012/0092735 A1 discloses a spatial light modulation device in which by means of a beam combiner, for example, light of a plurality of phase pixels of a phase modulator are combined in order to represent a complex value. In that case, for example, an amplitude with the value of zero is produced by destructive interference of the light of two phase pixels. However, in such a spatial light modulation device, the contrast of the represented image or of a scene is adversely affected by errors in the phase modulation of the pixels.

In the case of a complex light modulator sandwich, in the beam path of a display device an amplitude modulator and a phase modulator are arranged successively and are combined with one another in such a way that one complex value per pixel is realized. However, this necessitates a pixel-by-pixel alignment of the two spatial light modulation devices with one another, which cannot be realized in a simple manner. In other words, a sandwich structure for a complex-valued modulation can be produced by an individual spatial phase modulator and an individual spatial amplitude modulator being arranged in such a way that their glass substrates are disposed one behind another. If a beam of rays coming from the addressable layer of a pixel of the spatial phase modulator, after passing through the glass substrates, is then incident on the addressable layer of a pixel of the spatial amplitude modulator, it is already expanded at the aperture of said pixel on account of diffraction effects, with the result that crosstalk of the beams of rays from mutually adjoining pixels would disadvantageously occur.

In addition, it is known that spatial light modulation devices for various fields of use must or should often have the following properties: a large number of pixels and also a small pixel size (i.e. large space-bandwidth product), high modulation speed, high dynamic range, high diffraction efficiency, analog or digital control with high accuracy and reproducibility, high fill factor, application in different spectral ranges of the light and with different power densities. These are properties which, with light modulation devices disclosed above, mainly in combination, are achievable with difficulty.

However, US 2016/0327906 A1 describes a light modulation device designed as a zigzag light modulator in which light passes repeatedly through a single modulating layer of the spatial light modulation device. Said modulating layer has phase pixels and amplitude pixels arranged next to one another. A complex-valued modulation of the light is achieved by virtue of the light passing through the phase pixel and the amplitude pixel successively in the light path. Advantageously, as in the case of a complex sandwich set-up of the spatial light modulation device composed of phase modulator and amplitude modulator, the contrast is realized directly by the amplitude value of the amplitude pixels and not by interference, as a result of which the susceptibility to errors is reduced. Moreover, the light is modulated in a single layer of the spatial light modulation device, as a result of which the outlay on alignment of phase pixel and amplitude pixel with respect to one another as in the case of a sandwich set-up of the spatial light modulation device is eliminated.

In accordance with US 2016/0327906 A1, on account of the fact that amplitude pixels and phase pixels are arranged next to one another but are intended to be passed through successively in the light path, the effective fill factor for incident light decreases. If the spatial light modulation device is illuminated areally by a backlight unit (BLU), for example, then in comparison with a complex light modulator sandwich approximately 50% of the light incident from the backlight unit is lost as a result of the phase pixels and amplitude pixels being arranged next to one another.

If the phase modulation and amplitude modulation are based on liquid crystals, then the use of polarized light is generally required. The required polarization of the light relative to the orientation direction of the liquid crystal molecules (LC—liquid crystal) is typically also different for amplitude modulation and for phase modulation. This may result for example in the necessity of rotating the polarization of the light in the beam path between passing through the amplitude pixel and the phase pixel. US 2016/0327906 A1 describes for example the use of a structured retarder for rotating the polarization of the light. It discloses the following: "The light passed the apodization profile Apo hits a structured retardation element in form of a quarter wave plate QWP comprising quarter wave retardation element segments QWPS 20 which introduces a λ/4 retardation for a single pass.".

FIG. 1 shows an arrangement of a spatial light modulation device with a structured retarder or retardation element such as is also disclosed in US 2016/0327906 A1.

As evident, light is emitted by an illumination unit at a defined angle and is incident on the spatial light modulation device SLM. The light is first incident on a polarization element P1, passes through the latter and is incident on the phase pixels p with a defined polarization. At a back end of the phase pixels p, which introduce a phase shift $\varphi_i$, a mirror element SE is provided. The light incident on the phase pixels p is reflected back from the mirror elements SE, the light once again passing through the phase pixel. Afterward, the light passing through the phase pixels p twice propagates to a reflection plane RP, which provides a structure of structured reflectors in the form of mirror elements M. The reflection plane RP has a structured retarder in the form of a λ/4 plate QWP, which introduces a λ/4 retardation of the light for a single pass. The structured retarder is subdivided into individual segments QWPS arranged on top of the mirror elements M. The light is then reflected back from the mirror elements M and passes through the retarder QWP again. A polarization state of the light that is orthogonal to the entrance polarization of the light is generated in this way. The light reflected back from the mirror elements M is then incident on the amplitude pixels a. A polarization filter P2 is arranged at the exit plane of the spatial light modulation device. After passing through the spatial light modulation device SLM, the light can propagate to further elements (not illustrated here) of a display device.

In other words, in accordance with FIG. 1, the light is incident on the spatial light modulation device SLM, having phase pixels and amplitude pixels, obliquely from the left-hand side. The light passes through the polarization element P1, through an aperture and through a substrate S1 and is then incident in linearly polarized form on the phase pixel p. After passing through the phase pixel p, the light is reflected at a reflective element, the mirror element SE, passes once again through the phase pixel p, passes back through the substrate S1 and is then incident firstly on the retarder QWP. Afterward, the light is incident on the mirror element M, is reflected and passes once again through the retarder QWP and then passes again through the substrate S1 to the amplitude pixel a. The thickness of the substrate S situated between the aperture or the reflection plane RP and the liquid crystal layer with the amplitude pixels a and the phase pixels p, the angle α of incidence of the collimated light and the pixel pitch of the pixels are coordinated with one another here such that a light beam that is incident on the center of the phase pixel p, after passing back through the substrate S1 and being reflected at the mirror element M, is also incident on the center of the amplitude pixel a. If for example the substrate S1 has a thickness d1 and the pixel pitch of a single pixel, i.e. amplitude pixel or phase pixel, is p1, then the angle α of incidence is set by the illumination device such that $p1 = 2 \cdot d1 \cdot \tan \alpha$. If the substrate S1 has a thickness d1 of 50 micrometers, for example, and the pixel pitch is 15 micrometers, then the angle α of incidence would be set to 8.5 degrees. After passing through the amplitude pixel a, the light passes through a second substrate S2 and reaches the polarization filter P2 at the output of the spatial light modulation device SLM.

If light, e.g. laser light, is used which already substantially has a linear polarization, the polarization element P1 at the input of the spatial light modulation device SLM serves only for further improvement of the polarization extinction ratio of the light or can optionally also be omitted.

In the case of the use of the ECB (electrically controlled birefringence) mode or similar liquid crystal modes (LC modes), a quarter-wave plate, for example, is used as the retarder, the optical axis of said quarter-wave plate being rotated by approximately 22.5° relative to the polarization of the incident light. After passing through the quarter-wave plate twice, the polarization direction of the light is then rotated by 45°. The retarder has to be structured in this case, however. A further structured layer, namely a mirror, has to be applied on the retarder. Since retarders are usually organic layers, the structuring of the retarder may however be significantly more complicated than the structuring of a metal layer, such as e.g. a mirror.

However, the use of a structured retarder or retardation element in a spatial light modulation device requires complex production and also an accurate alignment of the retarder relative to the pixels of the spatial light modulation device. Moreover, in order to avoid diffraction effects, the retarder should be positioned very close to the modulating layer of the spatial light modulation device. US 2016/0327906 A1 describes the use of polarized light and a structured retarder, but does not specify any details about the polarization direction of the light used and the orientation of the retarder axes and the type of liquid crystal modulation.

Furthermore, the use of pixels of small size in the spatial light modulation device is advantageous for a holographic display or display device. In particular, for a holographic display with at least one virtual observer window through which an observer in an observer plane can observe a represented scene, the size of the virtual observer window scales with the pitch of a complex-valued macropixel, formed here from an amplitude pixel and a phase pixel, i.e. the sum of the pitch of the amplitude pixel and of the phase pixel.

Typical values for a desktop display are for example a pitch of the macropixel of 30×30 micrometers. For a complex sandwich composed of a plurality of layers according to the prior art, as disclosed above regarding the sandwich set-up of a spatial light modulation device, this would mean that even individual pixels of the spatial light modulation device could have this size. For a spatial light modulation device comprising a single layer providing amplitude pixels and phase pixels next to one another in this layer, this would mean, however, that amplitude pixels and phase pixels would each have a size of 15×30 micrometers.

However, for transmissive active matrix displays having a matrix of thin-film transistors used to drive the pixels, the usable pixel area is usually reduced by the area occupied by the transistor (TFT) for the pixel itself and also by data lines that conduct electrical signals from the edge regions of the display to the pixels. A "black mask" is typically used to mask or blacken the area of the transistors and of the lines in order that no light modulated in an undefined way is transmitted through these regions. Since, owing to the dictates of production, the black mask is normally not provided on the backplane substrate, on which the transistors and the data lines are provided, but rather on a substrate situated opposite the backplane substrate, both substrates have to be aligned with respect to one another in such a way that resulting tolerances can be accepted. However, this is not always easy, and time-consuming.

A region or an edge of approximately 5×10 micrometers (horizontally×vertically) that is covered by the black mask would normally have to be subtracted from a pixel. Given a pixel having a size of 30×30 micrometers, for example, an area of 25×20 micrometers would actually be usable as pixel aperture, which would correspond to an area proportion of 55%.

For a pixel half as large having a size of 15×30 micrometers, an area of only 10×20 micrometers would then be usable as aperture, which would correspond only to an area proportion of 44%.

A reduction of the size of the pixel aperture thus results in a reduction of the light efficiency of the spatial light modulation device since part of the incident light is absorbed by the black mask. In addition, with a smaller pixel aperture there is also an increase in the diffraction of light and thus in unwanted crosstalk of light between pixels, in the case of which for example light that is actually intended to be incident first on the phase pixel is however incident directly on the amplitude pixel.

As already mentioned, diffraction effects occur at the apertures or openings of the spatial light modulation device. Disadvantageously, light diffracted on the input side at an aperture might therefore not be incident on a desired pixel, for example the phase pixel, but rather on an adjacent pixel, for example the amplitude pixel, and then emerge again from the spatial light modulation device by virtue of the fact that it has only one modulation, i.e. only amplitude modulation or only phase modulation.

US 2016/0327906 A1 has already mentioned that this light diffracted on the input side at an aperture can advantageously be blocked by an output-side polarizer. However, US 2016/0327906 A1 gives no indications of how this polarizer should be oriented. Since a specific setting of an output-side polarizer is usually required for the amplitude modulation of the light, this setting cannot be chosen independently of that for the best suppression of diffracted light.

SUMMARY OF THE INVENTION

Therefore, it is an object of the present invention to provide and further develop a spatial light modulation device for the complex-valued modulation of light in accordance with US 2016/0327906 A1 in order in particular to realize a higher light efficiency and simpler production.

Furthermore, it is an object of the present invention to provide a spatial light modulation device which enables an increase in the fill factor to be achieved.

The invention is furthermore based on the object of providing a spatial light modulation device which enables crosstalk of light between adjacent pixels of the spatial light modulation device to be reduced and avoided for the most part.

The object is achieved according to the invention by means of a spatial light modulation device having the features as claimed in the claims.

The spatial light modulation device according to the invention has modulation elements in the form of pixels. Substantially one half of the pixels of the spatial light modulation device are designed as reflective, the other half of the pixels being designed as transmissive. The reflective pixels are arranged in alternation with the transmissive pixels in a same or in the same substrate plane of the spatial light modulation device. Furthermore, the spatial light modulation device comprises a backplane comprising transistors and data lines for conducting signals to the pixels. Each pixel is assigned at least one transistor and at least two data lines. The transistors and the data lines of each mutually adjacent pair composed of a reflective pixel and a transmissive pixel are arranged under the reflective pixel (in the light propagation direction).

Advantageously, the spatial light modulation device comprises at least one transparent substrate and an addressable transmissive layer, which is preferably designed as a liquid crystal layer comprising liquid crystal molecules, and which forms the pixels as modulation elements for modulating incident light. Preferably, two substrates are provided, between which the addressable transmissive layer is embedded. This addressable transmissive layer that can be designed as a liquid crystal layer thus forms the pixels of the spatial light modulation device that are able to modulate incident light corresponding in terms of phase and amplitude. According to the invention, the spatial light modulation device has only a single addressable transmissive layer or liquid crystal layer. The phase and the amplitude of the light are therefore modulated in adjacent pixels of the spatial light modulation device. That means that phase pixels and amplitude pixels are provided or arranged in alternation or alternatively in the same substrate plane. In this way, incident light passes through a phase pixel and an amplitude pixel successively in the light propagation direction. The order of the modulation of amplitude and phase of the light can also be reversed, in principle. However, with regard to the liquid crystal modulation it is generally more expedient if the light passes through the phase pixel twice, on account of reflection, and the amplitude pixel only once. In other words, reflective and transmissive pixels are present in the spatial light modulation device. Preferably, the phase pixels are designed as reflective pixels and the amplitude pixels are designed as transmissive pixels. By means of electrodes on the substrates, the pixels can be controlled in a defined manner and liquid crystal molecules of the liquid crystal layer can preferably be correspondingly aligned as an addressable transmissive layer. Furthermore, the spatial light modulation device according to the invention comprises a backplane, which has transistors and data lines, and also even further elements, such as storage capacitors, for example, which are of no further relevance to the present invention, however, and is provided for controlling the spatial light modulation device. Each pixel, i.e. each phase pixel and also each amplitude pixel, is assigned at least one transistor and at least two data lines. According to the invention, here the transistors and at least one portion of the data lines of each mutually adjacent pixel pair composed of a reflective pixel and a transmissive pixel are arranged under or behind the reflective pixel of this pixel pair.

On account of the fact that substantially half of the pixels, i.e. either the phase pixels or the amplitude pixels, are designed as reflective, the light therefore does not pass or penetrate through the backplane with the transistors and the data lines for the individual reflective pixels. According to the invention, the transistors and the data lines, at least one portion of the data lines, for each pixel pair composed of a reflective pixel and a transmissive pixel can thus be arranged under the reflective pixel associated with this pixel pair, such that the aperture of the transmissive pixel is no longer trimmed by the at least one transistor associated with said pixel and by at least one portion of the data lines associated with said pixel. That means that, if advantageously the phase pixel is designed as a reflective pixel and the amplitude pixel is designed as a transmissive pixel, the transistors and the data lines of each pixel pair composed of a phase pixel and an amplitude pixel are arranged under the phase pixel designed as reflective and associated with the pixel pair.

In this way, the pixel aperture is significantly enlarged and the fill factor is significantly increased as a result of the configuration according to the invention of the spatial light modulation device by way of the provision of reflective pixels in conjunction with transmissive pixels and the arrangement according to the invention of the transistors and at least one portion of the data lines. In addition, as a result a high light efficiency of the spatial light modulation device according to the invention is achieved, the diffraction of the light is minimized and thus unwanted crosstalk between light from adjoining pixels is significantly reduced or avoided.

For the explanation of the present invention, it is assumed that the reflective pixel is designed as a phase pixel and the transmissive pixel is designed as an amplitude pixel, the light passing through the phase pixel as first pixel and then through the amplitude pixel. It goes without saying that it is also possible for the light to pass through the amplitude pixel as first pixel.

Further advantageous configurations and developments of the invention are evident from the further dependent claims.

In one particularly advantageous configuration of the invention, it can be provided that the reflective pixel has a reflection layer, preferably a mirror element, the reflection layer being provided at the back end of the reflective pixel in the light propagation direction. This configuration of the spatial light modulation device according to the invention may be preferred in the case of the use of a backlight device in a display device, such that the light preferably incident first on the phase pixel is reflected in the direction of a downstream reflection plane in the light propagation direction and from said reflection plane to the amplitude pixel. A zigzag light beam is thus generated in the interior of the spatial light modulation device.

In a further advantageous configuration of the invention, it can be provided that the backplane has a black mask assigned to the transistors and to the data lines and configured in such a way that the black mask does not cover or mask an edge region of the aperture of the pixels over the entire extent. The pixels can be designed in rectangular fashion, for example, the aperture of the pixels being restricted at two opposite sides and not being restricted at the other two opposite sides. It goes without saying that the pixels can also have a different shape, such as a round or hexagonal shape, for example.

The backplane has a black mask assigned to the transistors and data lines of the pixels. Usually, the pixels are normally designed in rectangular fashion and arranged as a matrix in columns and rows. The pixels are individually addressed and controlled via the transistors. The data lines are thus arranged horizontally and vertically and connected to the individual transistors of the pixels in this way. In order that no light modulated in an undefined way penetrates through that region of the backplane which is provided with the transistors and data lines, the black mask is provided, which covers or masks this region of the transistors and data lines. In the case of such a matrix-type arrangement of the pixels in rows and columns and the assigned vertical and horizontal data lines, the masking of the vertical data lines by the black mask as in the prior art can thus be omitted since said black mask can simply be arranged concomitantly under the reflective pixels. Since, now, on account of the reflective pixels and the arrangement of the transistors and at least one portion of the data lines under the reflective pixels, the region which is provided with the transistors and data lines and which reduces the aperture of the pixels is significantly reduced with respect to the spatial light modulation devices of the prior art, in particular for the transmissive pixel a larger region of the pixel can thus be used for modulating the light. Consequently, the usable fill factor of the spatial light modulation device according to the invention is increased. Moreover, it is now necessary for the black mask only to be assigned to the data lines that are not arranged under the reflective pixels and for these data lines, for example the horizontal data lines, to be masked by the black mask. The proportion of the data lines to be masked by means of the black mask is now significantly smaller than when the transistors and data lines cannot be arranged under the reflective pixels. The problem of alignment tolerances is thus reduced.

Advantageously, it can be provided that the at least one transparent substrate has on one side the addressable transmissive layer with the pixels and on the other, opposite side a plane designed as a reflection plane.

Light that enters the spatial light modulation device then passes through both the reflective pixels and the transmissive pixels, the light being reflected by the intervening reflection plane. In this way, the light can pass through both reflective pixels and transmissive pixels which are all situated in one plane. As a result, combined phase and amplitude pixels (combined reflective and transmissive pixels) of a spatial light modulation device are provided in order to realize a complex-valued spatial light modulation device. In other words, phase pixels and amplitude pixels which lie close together or lie next to one another are combined. The spatial light modulation device has the addressable transmissive layer for forming the pixels. Said addressable transmissive layer can be a liquid crystal layer. However, other discrete realizations of the spatial light modulation device are also possible, e.g. electrowetting-based spatial light modulation devices or magnetophotonic crystal-based spatial light modulation devices. The liquid crystal thickness of such an addressable transmissive layer required for a $2\pi$ phase modulation of phase pixels is normally double the liquid crystal thickness required for a modulation of the amplitude pixels. In the case of the present invention, the liquid crystal layer thickness of the amplitude pixel can be equivalent to that of the phase pixel. This can preferably be realized by implementing a double-pass arrangement for the phase pixels. The deflection of the light that passes through the first pixels, the phase pixels or the amplitude pixels or the reflective pixels or the transmissive pixels, is introduced by the use of the reflection plane provided at one side of the spatial light modulation device.

A display device according to the invention for a holographic reconstruction of a scene can thus be provided which is of flat construction and which allows a complex light modulation to be achieved.

According to the invention, it can furthermore be provided that the reflection plane comprises a mirror system, at which light is reflected between passing through the reflective pixels and the transmissive pixels. The mirror system can comprise mirror elements.

Consequently, the mirror system can advantageously comprise mirror elements which are designed as reflective on the side facing toward the addressable transmissive layer with the pixels or which are designed as reflective on both sides, the side facing toward the addressable transmissive layer with the pixels and the side facing away therefrom.

If provision is made of a mirror system comprising mirror elements which are designed as reflective only on the side facing toward the addressable transmissive layer with the pixels, a spatial light modulation device can be provided which allows a light beam incident on an entrance plane of the spatial light modulation device preferably to be directed to the reflective pixel, which is preferably designed as a phase pixel, and to be modulated in terms of phase by this reflective pixel or the phase pixel. The light beam is then reflected at the reflection layer of the reflective pixel and directed further to a corresponding mirror element of the mirror system in the reflection plane, where the light beam is reflected at the mirror element and is guided or directed to the transmissive pixel, which is preferably designed as an amplitude pixel. The amplitude pixel modulates the incident light in terms of its intensity, the light then emerging in the direction from the spatial light modulation device in the direction of an observer area of a reconstructed scene.

By contrast, if provision is made of a mirror system comprising mirror elements which are designed as reflective on both sides, the side facing toward the addressable transmissive layer with the pixels and the side facing away therefrom, the light intensity or the light efficiency of the spatial light modulation device can be increased as a result. For the modulation of the light with two mutually adjacently arranged pixels (reflective pixel and transmissive pixel or phase pixel and amplitude pixel) of the spatial light modulation device which involves passing through these pixels successively in the light path, it is necessary to block a part of the incident light on the input side of the spatial light modulation device, such that light is incident and directed only in the direction of the reflective pixel or the phase pixel and reaches the amplitude pixel only after passing through the phase pixel. In an arrangement according to the prior art, e.g. in accordance with US 2016/0327906 A1, this light would be completely lost, however, as a result of which the light efficiency of the spatial light modulation device is disadvantageously impaired and thus decreased.

According to the invention, the mirror elements of the mirror system for the reflection between the phase pixels and the amplitude pixels can be designed in such a way that they not only have a reflective effect or act as mirrors on the inner side, i.e. toward the modulating transmissive layer or preferably liquid crystal layer, but also reflect the light at the input side or on the input side of the spatial light modulation device.

For this purpose, it can be advantageous if the mirror elements of the mirror system are arranged relative to the reflective pixels and the transmissive pixels in such a way that each mirror element covers both a part of the reflective pixel and a part of the transmissive pixel. In this way, the light can preferably be directed in the shape of a zigzag from the phase pixel/amplitude pixel via the mirror system to the amplitude pixel/phase pixel of the spatial light modulation device, such that the amplitude pixels and the phase pixels can be arranged in the same plane of the spatial light modulation device.

Advantageously, it can thus be provided that the addressable transmissive layer is coupled to the reflection plane in such a way that incident light passes through both the reflective pixel and the transmissive pixel of the addressable transmissive layer, the light being reflectable by the intervening reflection plane.

In a further advantageous configuration of the invention, it can be provided that an unstructured retardation element is provided.

Particularly advantageously, in this case, the unstructured retardation element can be arranged in the reflection plane and can be configured for setting the polarization of the incident light upon passing through a mutually adjacent pair composed of a reflective pixel and a transmissive pixel, which are designed as a phase pixel and an amplitude pixel and together form a complex pixel pair or macropixel, for the pixel through which the light passes as second pixel of the pixel pair.

According to the invention, the spatial light modulation device comprises an areal, i.e. non-structured or unstructured, retardation element, which can be arranged in the reflection plane. The unstructured retardation element is provided in order to suitably set the polarization of the light between passing through the respective two pixels (phase pixel and amplitude pixel) for the pixel that the light passes through second. A reflective pixel, preferably a phase pixel, and a transmissive pixel, preferably an amplitude pixel, form a complex pixel pair or macropixel.

The production of the spatial light modulation device can be significantly simplified by the use of an unstructured retardation element since now the areal or unstructured retardation element no longer has to be aligned with the mirror elements of the mirror system in the reflection plane in such a manner as in the case of a structured retarder of the prior art. Since a structured layer, namely the mirror system comprising the mirror elements, has to be applied on the retardation element, an unstructured retardation element now enables the production process to be implemented more simply and in a manner that saves more time. Moreover, retardation elements, also referred to as retarders, are usually organic layers that are not producible using semiconductor processes, for example for mirror layers. A structuring of a retardation element and an accurate alignment with the mirror elements provided thereon can thus be avoided or circumvented.

The unstructured retardation element can be designed as a quarter-wave plate or an eighth-wave plate.

According to the invention, it can furthermore be provided that a compensation retardation element is provided.

For this purpose, advantageously the compensation retardation element can be unstructured and can be designed as a quarter-wave plate or an eighth-wave plate, the compensation retardation element interacting with the unstructured retardation element in such a way that a required polarization of the light incident on that pixel of the complex pixel pair or macropixel which is to be passed through first is present.

The spatial light modulation device according to the invention can have a compensation retardation element, also referred to as compensation retarder, which can likewise be unstructured. The compensation retardation element is arranged in the spatial light modulation device in such a way that the incident light passes through it in the light propagation direction upstream of the respective two pixels of the addressable transmissive layer, the compensation retardation element suitably setting the polarization of the light for the pixel that is to be passed through first.

Both retardation elements, the unstructured retardation element and the compensation retardation element, act on the light incident thereon, such that the polarization of said light is altered. That means that the light incident on the spatial light modulation device according to the invention passes through the unstructured retardation element already before reaching the first pixel to be passed through, e.g. the phase pixel, of the addressable transmissive layer since the reflection plane, in which the unstructured retardation element is arranged, is provided upstream of the addressable transmissive layer in the light propagation direction in the case where a backlight is provided. In the case of a frontlight illumination of the addressable transmissive layer of the spatial light modulation device, the reflection plane is situated downstream of the addressable transmissive layer in the light propagation direction. If, by way of example, the light is intended to pass first through the phase pixel of the addressable transmissive layer, in the case where the ECB (electrically controlled birefringence) mode is used, linearly polarized light is required for the phase pixel, which light is emitted by an illumination device or the light emitted by an illumination device is converted into linearly polarized light by means of a polarizer. The unstructured retardation element will then convert the linearly polarized light incident thereon into circular light. In order to cancel or compensate for this conversion of the polarization of the light, a compensation retardation element can be provided, which is likewise designed in unstructured fashion, such that overall the combination of both retardation elements acts on the incident light and thereby generates linearly polarized light again.

The unstructured retardation element and the compensation retardation element can have an identical direction of the optical axes or their optical axes can be rotated by 90° with respect to one another.

Advantageously, two polarizers can be provided, one polarizer being able to be arranged in the region of the light entrance plane of the light modulation device and the other polarizer being able to be arranged in the region of the light exit plane of the light modulation device.

For example, the polarizer provided on the input side of the spatial light modulation device or in the region of the light entrance plane of the spatial light modulation device can be rotated by 45° relative to the required polarization at the phase pixel and the unstructured retardation element and the compensation retardation element can have an identical optical axis of approximately 22.5°, such that they jointly act as a half-wave plate ($\lambda$/2 plate). In this way, the polarization direction of the light can be rotated by 45° and the light will thereupon be incident with the desired polarization at the phase pixel. Alternatively, the unstructured retardation element and the compensation element can have optical axes that are rotated by 90° with respect to one another, with the result that in total their effects cancel one another out.

In a further advantageous configuration of the invention, it can be provided that the polarizer provided in the region of the light entrance plane of the light modulation device is designed as transmissive for one defined polarization and as reflective for another defined polarization and preferably as a wire grid polarizer. In this context, polarizer designed as reflective means that light having a specific, for example linear, polarization is reflected at the polarizer. In addition, however, light having another, for example likewise linear, polarization can also be transmitted by the polarizer. A wire grid polarizer reflects s-polarized light and transmits p-polarized light, for example.

In order to further increase the light intensity of the spatial light modulation device, in conjunction with the embodiment of the mirror elements of the mirror system as mirror elements designed as reflective on both sides, the polarizer provided in the region of the light entrance plane of the spatial light modulation device can be designed as reflective. The alignment of the optical axis of the compensation retardation element, which here in conjunction with the mirror elements of the mirror system which are designed as reflective both on the side facing toward the addressable transmissive layer and on the side facing away therefrom is designed as a retardation element or retarder for light recycling, and of the polarizer provided in the region of the light entrance plane of the spatial light modulation device can be chosen in such a way that light which is reflected by the mirror elements of the mirror system on the input side and is directed back to the polarizer provided on the input side or in the light entrance plane is rotated with regard to its polarization. All light or at least part of the light is therefore reflected by the polarizer provided in the light entrance plane and is thus directed or guided in the direction of the pixels again and can continue to be used.

The polarizer provided in the region of the light entrance plane can be designed as a wire grid polarizer. Coming from the illumination unit, p-polarized light, for example, is then transmitted by the wire grid polarizer. An s-polarized portion of the light which is reflected by the mirror elements in the reflection plane and is directed back to the polarizer is then reflected at the polarizer.

Furthermore, it can be provided that the distance between the polarizer provided in the region of the light entrance plane of the light modulation device and the mirror elements of the mirror system in the reflection plane is set to the same value as the thickness of the at least one substrate between the mirror elements of the mirror system and the addressable transmissive layer with the pixels.

By setting the distance between the polarizer provided in the region of the light entrance plane and the mirror elements of the mirror system to approximately or almost the same value as the thickness of the substrate between the mirror elements of the mirror system and the addressable transmissive layer, what is achieved is that after the reflection of the light at the polarizer provided on the input side, the light arrives at an opening or aperture of the addressable transmissive layer and is not incident again on the mirror elements of the mirror system.

The orientation of the liquid crystal molecules of the pixels can be settable in such a way that an orientation of the liquid crystal molecules of the transmissive pixels rotated by 45° with respect to an orientation of the liquid crystal molecules of the reflective pixels is present.

In one particular embodiment of the spatial light modulation device, a structured alignment or structured orientation of the liquid crystal molecules of the liquid crystal layer as addressable transmissive layer of amplitude pixels and phase pixels can be provided. By means of photoalignment, the liquid crystal molecules in the amplitude pixels can be aligned and arranged in a manner rotated by 45° in comparison with the liquid crystal molecules in the phase pixels. In the case of the ECB mode and similar liquid crystal modes, for example, this has the advantage that the polarization of the light between the amplitude pixels and the phase pixels either need not be rotated at all or can be rotated by 90 degrees.

In the first case, where no rotation of the polarization of the light is provided, the provision of an unstructured retardation element between the amplitude pixels and the phase pixels is thus obviated. In the second case, where a rotation of the polarization of the light by 90° is provided, the unstructured retardation element can be configured in such a way that its optical axis is set to approximately 45°.

According to the invention, it can furthermore be provided that the polarizer provided in the region of the light exit plane of the light modulation device has a polarization direction which is rotated by 90° with respect to the polarization direction of the light which is incident on the first pixel of the pair composed of a reflective pixel and a transmissive pixel when passing through the pixel pair.

If a structured alignment of the liquid crystals in the liquid crystal layer in the amplitude pixels and phase pixels is used in which the orientation of the liquid crystal molecules in the amplitude pixels is rotated by 45° relative to the orientation of the liquid crystal molecules in the phase pixels, then it is possible not to rotate the polarization of the light between the amplitude pixels and the phase pixels, i.e. not to use an unstructured retardation element or unstructured retarder. Moreover, the output-side polarizer provided in a region of an exit plane of the spatial light modulation device can be used in a manner rotated by 90 degrees relative to the polarization of the light with which the light is incident for example on the phase pixels as first pixels of the pixel pairs. In this case, light which, as a result of diffraction at the aperture in the reflection plane, is directly incident on an amplitude pixel adjoining the phase pixel would not be phase-modulated, but would likewise be amplitude-modulated. The portion of the light transmitted by the polarizer provided in the region of the light exit plane of the spatial light modulation device is thus proportional to the amplitude of the pixel, i.e. the absorbed portion of the light is all the greater, the smaller the amplitude of the pixel. This case is particularly advantageous to the effect that crosstalk of the pixels as a result of diffraction cannot have a disturbing effect on the contrast in this case. Pixels which are represented black and the amplitude value of which is equal to zero actually remain black because the diffracted light is completely filtered out or absorbed for these pixels.

In general terms, this means that according to the invention unwanted diffracted light which is incident in each case on pixels adjoining a pixel that is to modulate the light is filterable by the polarizer provided in the region of the light exit plane of the light modulation device. Preferably, it can be provided that the unwanted diffracted light which is incident in each case on pixels adjoining a pixel that is to modulate the light is filterable by the polarizer provided in the region of the light exit plane of the light modulation device depending on the amplitude value of the adjoining pixel.

Furthermore, advantageously a color filter arrangement can be provided, having color filters of the primary colors RGB, the individual color filters being assigned to the pixels alternately.

Since the light passes through amplitude pixels and phase pixels successively in the light propagation direction, for a color representation of a scene or an object it is basically sufficient if either the phase pixel or the amplitude pixel has a color filter. For reducing crosstalk, however, it is advantageous if amplitude pixels and phase pixels both have color filters. By way of example, color filters can be arranged as vertical strips of a color filter arrangement, such that a color comprises in each case a (double) column with amplitude pixels and phase pixels arranged next to one another. The amplitude pixels and phase pixels which lie or are provided in the (double) column over or under a complex pixel pair composed of an amplitude pixel and a phase pixel are assigned to the same color filter, but amplitude pixels and phase pixels which lie on the left or right next to said pixel pair, i.e. are assigned to another (double) column, are assigned to another color filter.

Consequently, it can advantageously be provided that a complex pixel pair composed of a reflective pixel and a transmissive pixel has a color filter of the same color, and adjacent complex pixel pairs composed of a reflective pixel and a transmissive pixel have a color filter of a different color. The two pixels, i.e. reflective pixel and transmissive pixel, of a complex pixel pair can thus each have a color filter of the same color. Alternatively, both pixels of the pixel pair jointly have only one color filter of one color or only one color filter is assigned to both pixels of the pixel pair.

The use of color filters in the spatial light modulation device can additionally result in a reduction of the crosstalk between pixels as a result of diffraction of light. If the spatial light modulation device is illuminated with light of a defined wavelength, then the light which passes through adjacent pixels or complex pixel pairs to which a color filter of another color is assigned is blocked by the color filter thereof.

According to the invention, the spatial light modulation device can be designed as a liquid crystal (LC)-based spatial light modulation device, or as a multi quantum well (MQW)-based spatial light modulation device.

Alternative light modulator configurations are possible, of course.

For example, the spatial light modulation device according to the invention can be an electrowetting-based spatial light modulation device for providing an amplitude modulation and/or a phase modulation.

Moreover, the spatial light modulation device can be designed as multi quantum well (also referred to as multiple quantum well) (MQW)-based. This type of modulator, which can operate in reflection or in transmission, can be configured to modulate the amplitude and/or the phase. In general, the principle of the serial combination of phase pixels and amplitude pixels adjoining one another can also be adapted to a non-liquid-crystal-based phase and amplitude modulator. By way of example, a magnetophotonic crystal (MPC)-based spatial light modulation device can be used.

Furthermore, the object according to the invention is achieved by means of a display device having the features as claimed in the claims.

The display device according to the invention comprises an illumination device and a spatial light modulation device according to the invention. The illumination device can comprise at least one light source, for example a laser light source or a light emitting diode (LED). The display device according to the invention is provided for the holographic reconstruction of a scene or of an object, preferably for displaying two-dimensional and/or three-dimensional images or contents or information. The display device comprises the spatial light modulation device according to the invention comprising combined reflective and transmissive pixels designed as phase pixels and amplitude pixels. The illumination device is configured in such a way that it is provided for illuminating the spatial light modulation device. In this way, combined phase pixels and amplitude pixels of a display panel are provided in order to realize a complex-valued display device.

Consequently, a display device for a holographic reconstruction of a scene is provided which is of flat construction and which allows a complex light modulation to be achieved.

A display device comprising these basic components can be provided with further optical components, or the existing components can be arranged differently in such a way that for example either a transmissive or a reflective spatial light modulation device is produced. In the case of the reflective spatial light modulation device, a reflection plane is then provided downstream of the addressable transmissive layer in the light direction, the incident light being reflected at said reflection plane.

Advantageously, it can be provided that the illumination device provides an oblique illumination of the light modulation device.

It can be preferred to use an oblique or obliquely passing illumination of the spatial light modulation device. By way of example, an illumination of the spatial light modulation device at 5° to 50°, preferably at 5° to 20°, could be used. An angular range of 5° to 20° can be expedient for a multiplicity of liquid crystal modes. Some liquid crystal modes can e.g. also be illuminated at 45° degrees. An oblique illumination can be provided by a plurality of types of illumination devices. Volume grating-based illumination devices are preferred, however. This is attributable to the angular selectivity and spectral selectivity of volume gratings based on Bragg diffraction. The illumination device can be designed as a frontlight illumination device or as a backlight illumination device.

By way of example, the display device according to the invention can have a field lens as a further component, the field lens being designed as a single component or as a combined field lens. The field lens can be designed as diffractive or refractive. If the field lens is designed as diffractive, it can have at least one volume grating. The combined field lens can preferably have at least one volume grating.

The display device comprises a field lens for the purpose of focusing the light modulated with required information by the spatial light modulation device into a defined region or to a defined location in a visibility range or a field of view of an observer who can observe a scene or object represented by the display device. Said field lens can be provided as an independent component or single component or as a combined field lens in the display device. By way of example, a complex-valued spatial light modulation device according to the invention can also be adapted to a volume grating-based field lens used in the display device according to the invention. For this purpose, a combined volume grating field lens has a first volume grating, which realizes a plane-to-plane reconstruction, which can be e.g. an obliquely passing plane wave of 0° degrees (on axis) to 30° degrees. A second volume grating has a reconstruction of a plane wave of 30° degrees relative to an on-axis field lens. The combination of these two volume gratings forms an on-axis volume grating field lens, referred to as a combined field lens.

Preferably, an obliquely passing or oblique illumination that results in an off-axis propagation of the complex-valued light can be used for eliminating the first volume grating of the combined field lens. For example, the SLM plane having the phase modulation pixels and amplitude modulation pixels to be combined can be illuminated at 30° degrees, which results in an off-axis propagation of the modulated wave field of –30° degrees. Consequently, the prediffraction volume grating that was previously used as a first element of the combined field lens is no longer required. The number of components used can be reduced in this way.

In a further advantageous configuration of the invention, it can additionally be provided that at least one tracking device is provided. Advantageously, the at least one tracking device can comprise at least one liquid crystal grating and/or at least one mirror element.

The display device according to the invention can comprise at least one tracking device, for example a vertical tracking device for tracking the light in a vertical direction and/or a horizontal tracking device for tracking the light in a horizontal direction, the vertical tracking device and/or the horizontal tracking device preferably having at least one liquid crystal grating.

The vertical tracking device and/or the horizontal tracking device, preferably arranged downstream of the complex-valued spatial light modulation device in the light propagation direction, are/is provided for tracking the light of a represented scene or object to a vertical and/or horizontal movement of an observer observing the scene or object.

Preferably, the at least one tracking device comprises at least one liquid crystal grating. By way of example, liquid crystal gratings, which are controlled electrically by electrodes, can generate one-dimensional phase profiles. These controllable one-dimensional phase profiles can provide a wedge function suitable for tracking the light to be sent to an observer's eye. Furthermore, cylindrical phase functions can be generated. Consequently, cylindrical lens functions can be generated in addition to the provision of the tracking by the generation of different grating periods and a different local phase inclination, said cylindrical lens functions reducing aberrations of functions of inclined lenses. A plurality of liquid crystal gratings can be used in series. In this way, e.g. two liquid crystal gratings having an angular offset of 90° can be stacked or arranged one on top of the other.

There are then various possibilities for advantageously configuring the teaching of the present invention and/or combining the described exemplary embodiments or configurations with one another, if possible. To that end, reference should be made firstly to the patent claims subordinate to the alternative independent patent claims, and secondly to the following explanation of the preferred exemplary embodiments of the invention with reference to the drawings, in which generally preferred configurations of the teaching are also explained. In this case, the invention is explained in terms of basic principles on the basis of the exemplary embodiments described, but is not intended to be restricted thereto.

BRIEF DESCRIPTION OF THE DRAWINGS

The figures show:

FIG. 4a: an outline representation of a spatial light modulation device according to the invention with an unstructured retardation element, in top view;

FIG. 4b to FIG. 4d: outline representations of embodiments of the spatial light modulation device in accordance with FIG. 4a in a perspective view;

FIG. 10: an outline representation of a display device according to the invention comprising the spatial light modulation device according to the invention.

It should briefly be mentioned that identical elements/structural parts/components may also have the same reference signs in the figures.

DETAILED DESCRIPTION OF THE INVENTION

Figure 1:
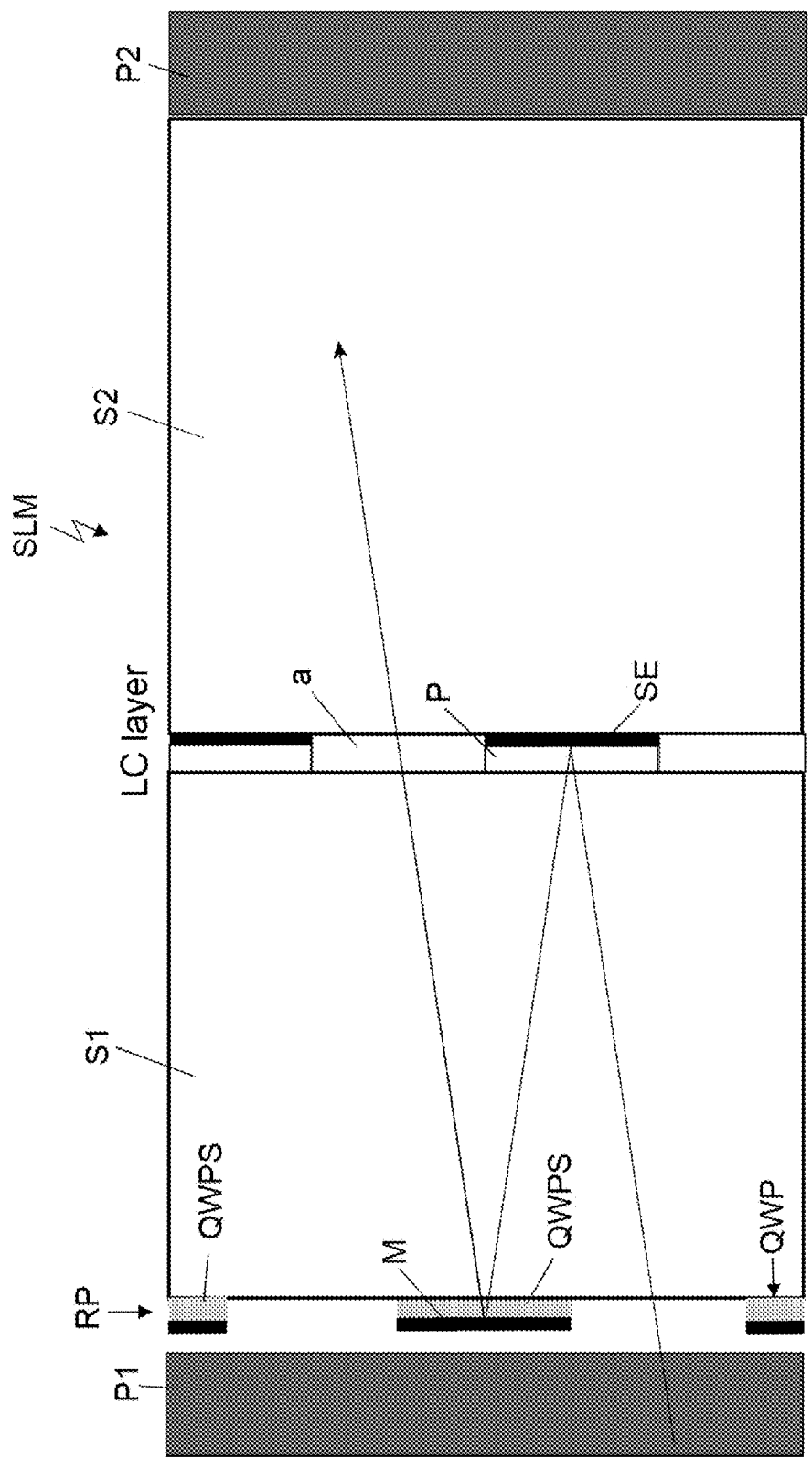
FIG. 1: an outline representation of a spatial light modulation device according to the prior art.
Figure 2:
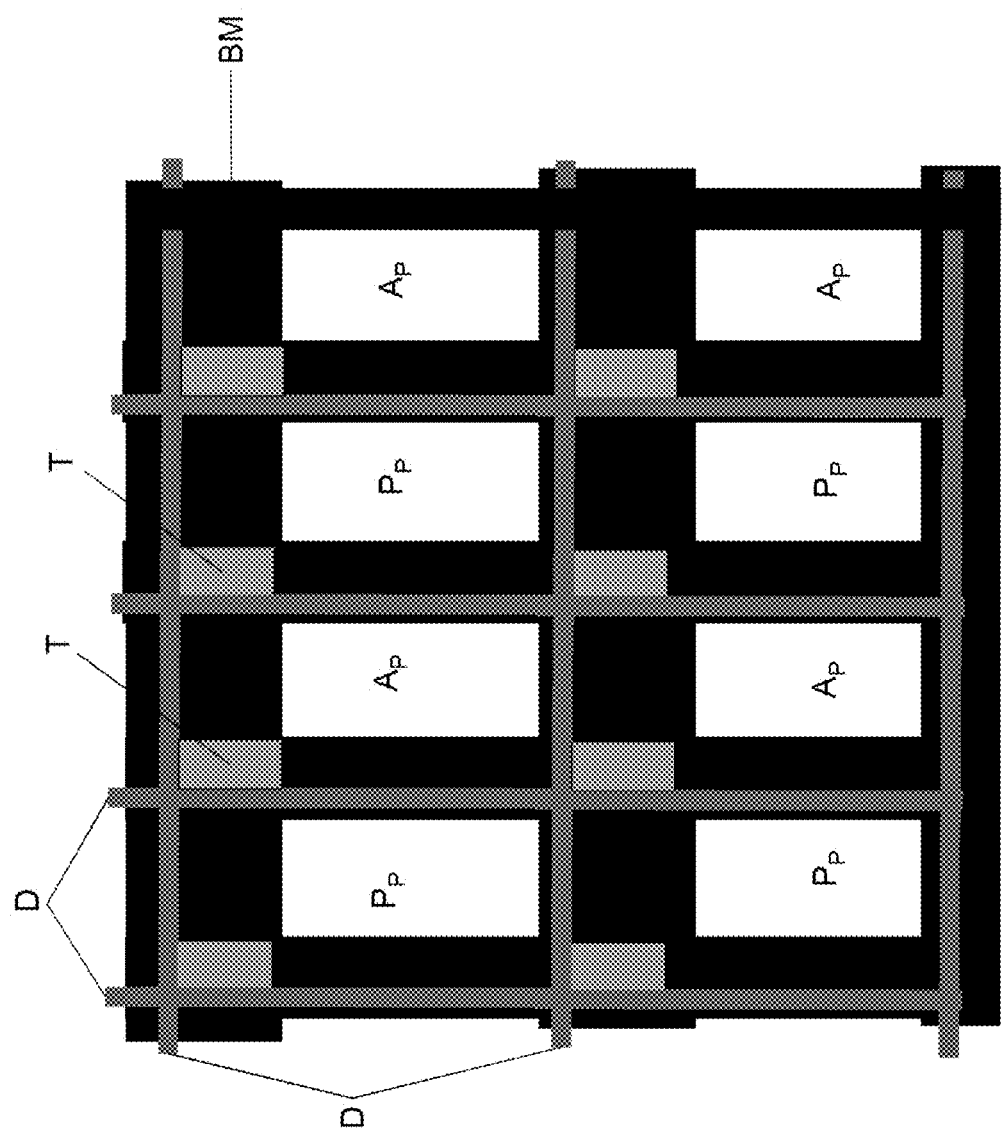
FIG. 2: an outline representation of a detail of a spatial light modulation device with a pixel arrangement in top view, according to the prior art.

A basic configuration of a spatial light modulation device according to the prior art is shown in a top view in FIG. 2, only a pixel arrangement in conjunction with a backplane being illustrated. A serial combination of phase pixels Pp and amplitude pixels Ap adjoining one another laterally and arranged in the same addressable transmissive layer or layer plane is provided in the spatial light modulation device. The addressable transmissive layer for forming complex-valued pixels is preferably a liquid crystal layer, for example. The phase pixels Pp and the amplitude pixels Ap are thus arranged next to one another, as is discernible. In general, on the spatial light modulation device normally approximately 50% of the panel region is provided for non-transparent structures, e.g. for data lines and transistor structures provided in the backplane.

As is discernible in FIG. 2, the pixels are arranged in matrix form in columns and rows. The pixels are individually addressed from the backplane via transistors TFT connected to vertical and horizontal data lines D. The transistors TFT of the pixels Pp and Ap are controlled via the data lines D arranged in columns and rows, so-called source lines and gate lines. The transistors TFT and the data lines are configured for conducting signals to the individual pixels. The spatial light modulation device additionally has a black mask BM, which covers the regions of the panel which are assigned to the data lines D and the transistors TFT of the backplane. The black mask BM is typically provided on a substrate of the spatial light modulation device situated opposite a substrate of the backplane. In this way, that area of this substrate which is assigned to the data lines D and the transistors TFT is blackened, such that no light can penetrate through these regions of the spatial light modulation device.

The light incident on the spatial light modulation device passes firstly through the phase pixel Pp and then the amplitude pixel Ap, or else vice versa. In this case, however, the pixel aperture is significantly reduced since an associated transistor TFT is arranged in each pixel Pp and Ap, in addition the horizontal data lines D and the vertical data lines D likewise running through the pixels Pp and Ap. The transistors TFT and the data lines D are thus completely masked by the black mask BM, which, on account of alignment tolerances of the two substrates on which the black mask BM, the transistors TFT and data lines D are situated, is made slightly wider than the data lines D in conjunction with the transistors TFT per se. The aperture of the individual pixel Pp or Ap through which light is intended to and can pass is thus considerably reduced by the transistor TFT, the data lines D and the black mask in particular for pixels of small size.

Figure 3:
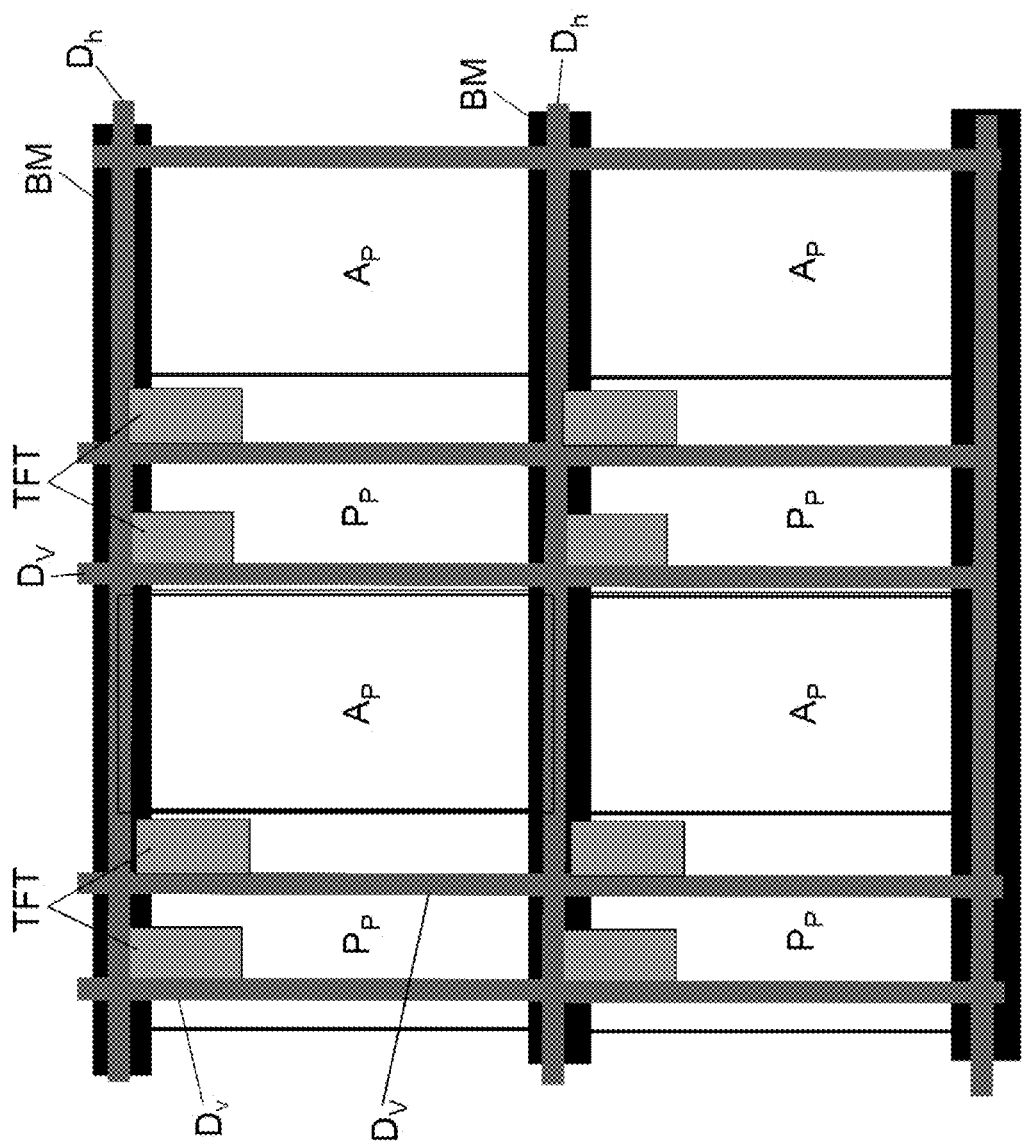
FIG. 3: an outline representation of a spatial light modulation device according to the invention with a detail of a pixel arrangement, in top view.

By contrast, FIG. 3 illustrates a spatial light modulation device which, according to the invention, achieves or has a larger aperture of the pixels Pp and Ap on account of a specific arrangement of the transistors and data lines.

FIG. 3 shows the spatial light modulation device according to the invention in top view, which in terms of the basic set-up has the same elements or components as the spatial light modulation device according to FIG. 2. That means that the spatial light modulation device comprises an addressable transmissive substrate, preferably designed as a liquid crystal layer. Said addressable transmissive layer forms the pixel layer with the pixels Pp and Ap and is embedded between two substrates. The pixel layer has phase pixels Pp and amplitude pixels Ap arranged in alternation next to one another in one plane. Substantially half of the pixels of the addressable transmissive layer or of the pixel layer are designed as reflective, and the other half as transmissive, such that reflective pixels alternate with transmissive pixels in the same plane in terms of their arrangement. In the present exemplary embodiment, the phase pixels are designed as reflective and the amplitude pixels as transmissive, although there is also the possibility, of course, that the amplitude pixels could be designed as reflective and the phase pixels as transmissive. A phase pixel Pp and an adjoining amplitude pixel Ap next to it together form a complex pixel pair.

In this exemplary embodiment, the light which comes from an illumination device and is incident on the spatial light modulation device, referred to as SLM hereinafter, is now incident here firstly on the phase pixel Pp designed as reflective and is reflected by said phase pixel by way of a reflection layer provided at the phase pixel Pp, which reflection layer can be designed as a mirror element. In this case, said reflection layer is provided at a back end of the reflective pixel, here then of the phase pixel Pp, in the light propagation direction, such that the light passes through the phase pixel Pp, is incident on the reflection layer, is reflected by the latter and passes once again through the phase pixel. In this case, the light, in terms of its phase, is modulated or changed or adapted according to the required information. After passing through the phase pixel, the light is directed via a reflection plane further in the direction of the transmissive pixel, i.e. here the amplitude pixel Ap, and passes through the latter in order to be correspondingly modulated in terms of amplitude. As is discernible, there is a relatively large difference in the aperture of the pixels in FIG. 3 in comparison with FIG. 2. The aperture of the pixels Pp and Ap in FIG. 3 is larger than that in FIG. 2, such that the fill factor of the SLM in FIG. 3 is significantly greater than that in FIG. 2. A larger aperture of the pixels Pp and Ap, or a greater fill factor is achieved by virtue of the fact that substantially half of the pixels of the pixel layer of the SLM are designed as reflective and transistors TFT associated with each pixel pair having a phase pixel Pp and an amplitude pixel Ap and at least one portion of the data lines D of this pixel pair of the backplane, on which the transistors TFT and data lines D are provided, are arranged behind or under the reflective pixel of the respective pixel pair, such that when light passes through the individual pixels, these transistors and data lines assigned to or associated with each pixel pair do not reduce the aperture of these pixels or make it smaller. That means that since substantially one half of the pixels of the pixel layer of the SLM are designed as reflective, the phase pixels Pp then in this exemplary embodiment, the light cannot pass through these reflective pixels, but rather is reflected by these pixels. That is to say that the light incident on the phase pixels Pp designed as reflective is not transmitted by these pixels, but rather reflected. A region through which the light does not penetrate can thus be formed or provided on the side of the reflective pixels or of the phase pixels Pp facing away from the incident light. Therefore, this back region of the respective reflective pixel, here then of the phase pixel Pp, can be used for accommodating components. The backplane comprising the transistors and the data lines is thus not passed through by the light at all for the reflective pixel. In other words, the back or lower region of the respective reflective pixel of each pixel pair through which the light does not penetrate is configured in this way by virtue of the transistors TFT assigned to each individual pixel pair and at least one portion of the associated data lines D being arranged there. Each pixel of the pixel layer is assigned at least one transistor TFT, such that the reflective pixel, here the phase pixel Pp, and the transmissive pixel, here the amplitude pixel Ap, are each assigned at least one transistor TFT, as is discernible in FIG. 3. These at least two transistors TFT per pixel pair can be provided behind or under the reflective pixel, i.e. here the phase pixel Pp, such that the at least one transistor TFT assigned to the transmissive pixel, here the amplitude pixel Ap, does not restrict the aperture of the transmissive pixel. As already disclosed with respect to FIG. 2 and also with respect to FIG. 3, the data lines D of the backplane are normally provided or arranged in horizontal and vertical directions, i.e. the data lines D delimit the individual pixels Pp and Ap in each case laterally horizontally and laterally vertically. In this case, it is possible to provide behind or under the reflective pixel of the pixel pair at least vertical data line Dv assigned to and controlling the at least one transistor TFT of the transmissive pixel of the pixel pair, such that at least these vertical data lines Dv of the pixel pairs do not restrict the aperture or opening of the transmissive pixels. The arrangement of the vertical data lines Dv assigned to the reflective pixels is likewise provided behind or under the reflective pixels. Therefore, at least one portion of the data lines and the transistors TFT for each pair of amplitude pixel Ap and phase pixel Pp are both arranged under the reflective pixel. Consequently, all transistors TFT and all vertically oriented or provided data lines Dv can thus be arranged in the region behind or under the reflective pixels. Data lines Dh provided in a horizontal direction are still masked by means of a black mask BM, however, such that no light modulated in an undefined way can penetrate. However, now in comparison with FIG. 2 the area of the pixel layer which is blackened or masked by means of the black mask BM is significantly smaller, i.e. the transmissive region of the SLM through which light can penetrate is significantly larger. As a result, the usable fill factor of the SLM increases significantly on account of the larger extent of the pixel aperture. The transistors TFT and the data lines D are configured for conducting signals to the individual pixels.

Disclosed in general terms, FIG. 3 shows an SLM in top view with an arrangement of transistors TFT and data lines Dv and Dh, where the transistors TFT and the vertical data lines Dv for each pair of amplitude pixel Ap and phase pixel Pp are arranged in each case in the phase pixel. Only the horizontal data lines Dh still run through all pixels of the pixel layer of the SLM. It goes without saying that the arrangement shown can also be provided in a manner rotated by 90 degrees and the amplitude pixels Ap and the phase pixels Pp can lie one above another. Since, in this exemplary embodiment, the phase pixel Pp is designed as reflective, i.e. a reflection layer is arranged over the data lines Dv and Dh as viewed from the backplane, these do not cause any disturbance in the phase pixel Pp. On the other hand, for the amplitude pixel Ap designed as transmissive, in this way a larger portion of the pixel area or pixel aperture can be used for the light to pass through.

The SLM described and illustrated in accordance with FIG. 3 can be configured further as described in the subsequent FIGS. 4 to 8.

Figure 4B:
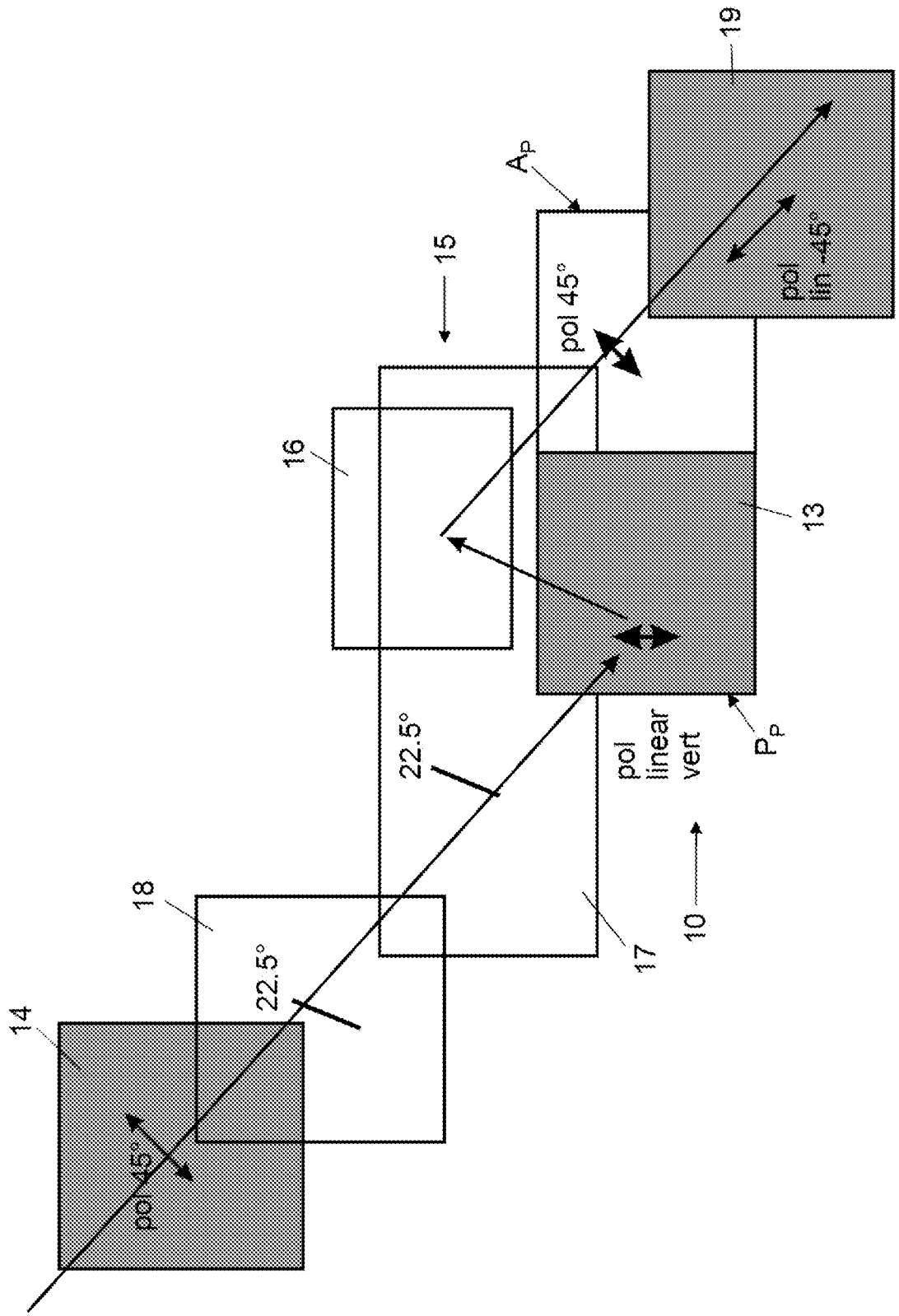
Figure 4D:
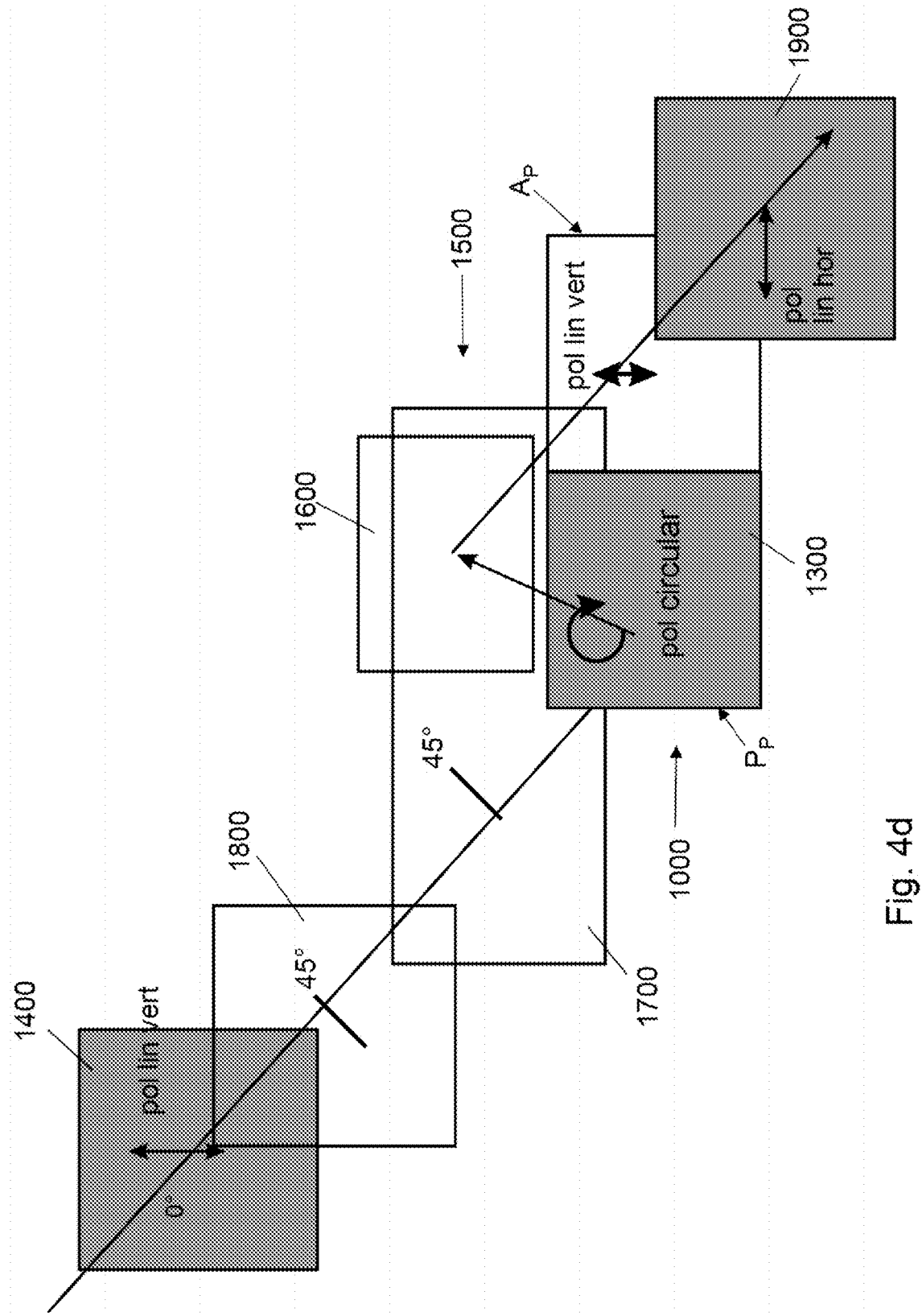

FIGS. 4a to 4d illustrate a spatial light modulation device (SLM) which allows simple production, FIG. 4a showing the basic set-up and the manner of functioning and FIGS. 4b to 4d showing different embodiments of this SLM.

FIG. 4a illustrates in side view an SLM having a single addressable transmissive layer 10, here in the form of a liquid crystal layer, between two substrates 11 and 12. By applying an electric field to the liquid crystal layer by means of an electrode arrangement, it is possible for example to alter the alignment of the liquid crystals in the liquid crystal layer and in this way to carry out a modulation of the light. In this case, the phase and amplitude of the light incident on the SLM are modulated in adjacent pixels of the SLM. The SLM thus has phase pixels Pp and amplitude pixels Ap in alternation next to one another in the same plane. As already mentioned, a phase pixel Pp and an adjoining amplitude pixel Ap form a complex pixel pair. The phase pixels Pp are designed here as reflective, and the amplitude pixels Ap as transmissive. Therefore, the phase pixels have a reflection layer 13 at their back end or in the back region, under which reflection layer, as described in FIG. 3, transistors and data lines can be concealed and arranged. However, the arrangement of transistors and data lines downstream of the reflection layer of the reflective pixels of the SLM in the light propagation direction is not necessarily provided. That means that the SLM in accordance with the configurations according to FIGS. 4a to 4d need not be configured in accordance with FIG. 3, i.e. arrangement of transistors and data lines downstream of the reflective pixels in the light propagation direction. The transistors and data lines of the backplane of the SLM can also be arranged in the SLM in a conventional manner, as known from the prior art, for example as described and shown in FIG. 2.

An illumination device (not illustrated) configured as a backlight device emits collimated light onto the SLM. The collimated light is emitted by the illumination device at a defined illumination angle, e.g. 10°, thus resulting in an oblique illumination of the SLM, as is discernible in FIG. 4a. Such an illumination angle is expedient for a plurality of liquid crystal modes. The light incident on the SLM additionally has a defined polarization state producible by means of a polarizer 14 provided in the region of the light entrance plane of the SLM. The light passes firstly through the phase pixels Pp and then through the amplitude pixels Ap successively in the light propagation direction. In this case, the order of the modulation of amplitude and phase of the light can also be reversed, in principle. With regard to the liquid crystal modulation it is preferred, however, if the light passes through the phase pixel Pp twice on account of the reflection at the reflection layer 13, and in contrast through the amplitude pixel Ap only once. A reflection plane 15 is provided in the light propagation direction between the phase pixels Pp and the amplitude pixels Ap, at which reflection plane the light modulated in terms of phase by the phase pixels Pp is reflected and directed in the direction of the amplitude pixels Ap. In other words, the first transparent substrate 11 thus has on one side the addressable transmissive layer 10 with the pixels and on the other, opposite side a plane configured as the reflection plane 15. Therefore, the light is now incident firstly on the phase pixel Pp of the complex pixel pair composed of a phase pixel Pp and an amplitude pixel Ap, and is reflected at its back end of the phase pixel Pp at the reflection layer 13, which can be designed as a mirror element or mirror layer, thus resulting in the realization of a double-pass arrangement within the phase pixel Pp. The thickness of the liquid crystal layer 10 required for a 2λ phase shift, which has to be provided by the phase pixels Pp, is thus reduced. The light reflected by the phase pixel Pp now propagates to the reflection plane 15 having a mirror system. The mirror system has mirror elements 16 which are designed as reflective on the side or region facing toward the liquid crystal layer 10 with the pixels Pp and Ap and are arranged relative to the reflective and the transmissive pixels, i.e. relative to the phase pixels Pp and the amplitude pixels Ap, in such a way that each mirror element 16 covers both a part of the reflective pixel and a part of the transmissive pixel. After the reflection of the light at the mirror elements 16 of the mirror system, the light is steered to the transmissive amplitude pixels Ap and correspondingly modulated there in terms of its amplitude.

In addition, an areal, thus non-structured or unstructured, retardation element 17, which may also be referred to as a retarder, is provided in the reflection plane 15. This unstructured retardation element 17 serves for a suitable setting of the polarization of the light for that pixel of the pixel pair which is passed through second when the light passes through the two mutually adjacent pixels forming the pixel pair, here the reflective pixel, here phase pixel Pp, and the transmissive pixel, here amplitude pixel Ap. The unstructured retardation element 17 can be designed as a quarter-wave plate or λ/4 plate or as an eighth-wave plate or λ/8 plate.

By way of example, an SLM can be operated in the ECB mode (electrically controlled birefringence mode), as is illustrated in perspective view in FIG. 4*b*. For this liquid crystal mode, a phase pixel Pp, for the modulation of the phase of the light, requires linearly polarized light with a polarization direction parallel to the orientation (alignment direction) of the liquid crystal molecules in the liquid crystal layer 10. By contrast, an amplitude pixel Ap for the modulation of the amplitude of the light requires light which is likewise linearly polarized, but has a polarization direction rotated relative to the orientation of the liquid crystal molecules of the liquid crystal layer 10. The polarization direction of the light for the amplitude pixel Ap should preferably be provided in a manner rotated by 45° relative to the orientation of the liquid crystal molecules.

For a first clarification and elucidation of the invention, the SLM illustrated in FIGS. 4*a* and 4*b* is operated in the ECB mode. It is also possible, of course, to operate the SLM in a different liquid crystal mode, which hereinafter will also be discussed later with respect to FIG. 4*d*. The polarized light incident, then, on the SLM in accordance with FIGS. 4*a* and 4*b* already passes through the retardation element 17 in the light propagation direction before reaching the reflective phase pixel Pp as first pixel of the pixel pair, said retardation element 17 being designed as a quarter-wave plate in the case of the ECB mode used here. However, since linearly polarized light is required for the phase pixel Pp and the retardation element 17 would convert the incident linearly polarized light into circular light, a compensation retardation element 18 is provided for the compensation of this light conversion. Just like the unstructured retardation element 17, the compensation retardation element 18 is configured in areal or unstructured fashion. It can likewise be designed as a quarter-wave plate. The compensation retardation element 18 compensates for the conversion of the polarization by the unstructured retardation element 17, such that as viewed overall the combination of both retardation elements 17 and 18 acts on the light incident on the phase pixel Pp, said combination thus producing linearly polarized light again. In other words, the compensation retardation element 18 interacts with the unstructured retardation element 17 in such a way that a required polarization of the light incident on that pixel of the pixel pair which is to be passed through first is present or produced. The compensation retardation element 18 is therefore arranged upstream of the reflection plane 15 of the SLM in the light direction, such that the light passes through said reflection plane in the light path upstream of the respective two pixels of the pixel pair of the SLM, the compensation retardation element 18 suitably setting the polarization of the light for the first pixel of the pixel pair through which the light is to pass. However, the compensation retardation element 18 is not absolutely necessary as long as light with a defined polarization is incident on the SLM, said polarization being converted by the unstructured retardation element 17 into a required linearly polarized polarization of the light for the phase pixel Pp.

The linearly polarized light thus present downstream of the unstructured retardation element 17 and the compensation retardation element 18 in the light direction is now incident on the phase pixel Pp, is correspondingly changed in terms of its phase and is steered as reflected light in the direction of the reflection plane 15 and is incident there once again on the unstructured retardation element 17, as is illustrated by the arrow(s). The unstructured retardation element 17 acts like a half-wave plate during the double pass of the light and thus rotates the polarization of the light by double the angle between the incident polarization direction and the optical axis of the unstructured retardation element 17, i.e. by 2×22.5°, thus by 45°. Consequently, the polarization of the light is rotated by 45° with respect to the linearly vertical polarization of the light incident on the phase pixel. This polarization state serves for providing the entrance polarization required for the amplitude pixel Ap. After the change in the polarization state of the light, the latter is now incident on the amplitude pixel Ap and passes through the latter. After passing through the amplitude pixel Ap, the light passes through the second substrate 12 in accordance with FIG. 4*a* and is incident on a polarizer 19 provided in the region of the light exit plane of the SLM. Said polarizer 19 allows passage of the light coming from the amplitude pixel Ap with a defined polarization, such that the modulated light leaves the SLM in a direction in the light path of downstream components or elements. The polarizer 19 is designed here such that it has an optical axis that is rotated by −45° with respect to the required polarization of the light for the phase pixel Pp.

Both the unstructured compensation retardation element 18 and the polarizer 14 provided in the region of the light entrance plane of the SLM need not absolutely necessarily be provided in the SLM. Neither of the two elements, neither compensation retardation element 18 nor polarizer 14, is necessary if light already polarized in a defined way is incident on the SLM, said light being polarized in such a way that in combination with the unstructured retardation element 17 a polarization of the light is established which is required for that pixel through which the light is to pass first in a pixel pair composed of a phase pixel Pp and an amplitude pixel Ap. In particular, that is the case for the ECB mode if already circularly polarized light is incident on the SLM. If for example circularly polarized light is incident on the SLM, and if the unstructured retardation element 17 is designed as a quarter-wave plate that converts the circularly polarized light into linearly polarized light, then this linearly polarized light is incident on the ECB phase pixel as desired.

Furthermore, configurations can also be provided in which one of the two elements is necessary, but the other is not. For the ECB mode, the unstructured compensation retardation element 18 is necessary, whereas the polarizer 14 provided in the region of the light entrance plane of the SLM is not necessary, if light having a defined linear polarization is already emitted by the illumination device. However, the polarizer could advantageously nevertheless be provided in the SLM in order to further improve the degree of polarization of the light.

In accordance with FIG. 4b, the polarizer 14 on the input side or provided in the region of the light entrance plane of the SLM is rotated by 45° relative to the required polarization of the light at the phase pixel Pp. In this case, the unstructured retardation element 17 and the compensation retardation element 18 can both have an identical optical axis of 22.5°, such that they jointly act as a half-wave plate ($\lambda/2$ plate). Given this circumstance, when the light emitted by the illumination device passes through the two retardation elements 17 and 18, the polarization direction of the light is then rotated by 45° and the light arrives at the phase pixel Pp with the linear polarization required for the phase pixel Pp. In this exemplary embodiment, linearly vertically polarized light arrives at the phase pixel Pp and, after reflection in the reflection plane 15, is rotated by 45° by means of the unstructured retardation element 17 and is incident on the adjoining amplitude pixel Ap.

Alternatively, an unstructured retardation element and a compensation retardation element can have optical axes that are rotated by 90° with respect to one another, such that their effects cancel one another out in total, as is shown in a further case of an ECB mode in accordance with FIG. 4c in combination with FIG. 4a, this SLM having the same components as the SLM according to FIG. 4a and in principle being similar in terms of functioning. An unstructured retardation element 170 provided is designed here as a quarter-wave plate again, a compensation retardation element 180 likewise being designed as a quarter-wave plate. However, the orientation of the optical axes of the quarter-wave plates and the orientation of the polarizer are provided differently than in FIG. 4b. If the polarization direction of an input-side polarizer 140 of the SLM, or polarizer provided in the region of the light entrance plane of the SLM, is at 0 degrees (0°), such that this polarizer 140 transmits linearly vertically polarized light, and the optical axis of the compensation retardation element 180 is at −67.5° and the optical axis of the unstructured retardation element 170 is at +22.5°, then the light is still linearly polarized at 0° after passing through the compensation retardation element 180 and through the unstructured retardation element 170. In this way, just like in FIG. 4b, linearly vertically polarized light is incident on the phase pixel Pp—to be passed through first—of the pixel pair in an addressable transmissive layer 100. After passing through the compensation retardation element 180 and the unstructured retardation element 170, the path of the light from the phase pixel Pp via a reflection plane 150 with mirror elements 160 of a mirror system to the amplitude pixel Ap as far as a polarizer 190 on the output side or provided in the region of the light exit plane of the SLM is the same path as illustrated in the previous configuration of the SLM according to FIGS. 4a and 4b. A repetition of the description of the light path through the components of the SLM illustrated in FIG. 4c will thus be dispensed with.

For other liquid crystal modes based on in-plane modulation in accordance with FIG. 4d, such as the IPS mode (in-plane switching), for example, or else modes based on an in-plane rotation of the liquid crystals in the out-of-plane electric field, an amplitude pixel requires linearly polarized light, whereas a phase pixel requires circularly polarized light. Here, too, the basic set-up of an SLM based on in-plane modulation corresponds in principle to the set-up of the SLM according to FIG. 4a.

After the light leaves the phase pixel and before it is incident on the amplitude pixel of a pixel pair, the polarization of the light thus has to be changed from circularly polarized light to linearly polarized light. This can be done in accordance with FIG. 4d, for example, by means of an unstructured retardation element 1700 designed as an eighth-wave plate. In this case, the light passes twice through this unstructured retardation element 1700, which has an optical axis of 45°, and which accordingly acts in total as a quarter-wave plate. In this case, an eighth-wave plate can likewise be provided as a compensation retardation element 1800, which has an optical axis of likewise 45° and is unstructured. Since the set-up of such an SLM corresponds in principle to the set-up of the SLM according to FIG. 4a, the light incident on the SLM is once again steered firstly onto the reflective phase pixel Pp and then to the amplitude pixel after a reflection at a reflection plane 1500. The further components of the SLM correspond to the components of the SLM in accordance with FIG. 4a. That means that an addressable transmissive layer 1000, preferably a liquid crystal layer, is embedded between two substrates, said layer having reflective and transmissive pixels. Furthermore, provision is made of the reflection plane 1500 with a mirror system comprising mirror elements 1600 and the unstructured retardation element 1700 in the light direction between the reflective phase pixel Pp and the transmissive amplitude pixel. In addition, the SLM has a polarizer 1400 provided in the region of the light entrance plane of the SLM, said polarizer having an optical axis of 0° and thus transmitting linearly vertically polarized light to the compensation retardation element 1800. This light rotated by 45° by the compensation retardation element 1800 is incident on the unstructured retardation element 1700, whereby the light is once again rotated by 45° and a circular polarization is thus produced. Afterward, the circularly polarized light is incident on the phase pixel Pp, is reflected by the latter at the back end thereof at the reflection layer 1300, and the reflected phase-modulated light is directed in the direction of the reflection plane 1500. There said light, as viewed in the light direction, passes through the unstructured retardation element 1700, is incident on the mirror element 1600 and once again passes through the unstructured retardation element 1700, such that after passing through the unstructured retardation element 1700, the light has now been converted from circularly polarized to linearly polarized. In this case, linearly vertically polarized light is now incident on the amplitude pixel Ap. After a modulation of the light in terms of its amplitude, the light passes through a polarizer 1900 provided in the region of the light exit plane of the SLM, the optical axis of said polarizer running at 90°, such that linearly horizontally polarized light leaves this polarizer 1900 and thus the SLM.

In this way, in accordance with the embodiments with respect to FIGS. 4a, 4b, 4c and 4d, a structuring of the unstructured retardation element 17, 170, 1700 can be dispensed with. As a result, the production of the SLM per se can be significantly simplified and facilitated since an exact alignment of the areal or unstructured retardation element 17, 170, 1700 with the mirror elements 16, 160, 1600 of the mirror system can be circumvented or avoided.

The SLM can likewise have further elements or components, such as an apodization profile or further polarization filter elements, for example. However, since these are not of importance to the invention, they will not be described in detail.

These extensions and improvements of the invention according to FIG. 3 as described in FIGS. 4a to 4d have been described in connection with an SLM in which transistors and data lines are arranged under the reflective pixels. However, it is also possible that the embodiments in accordance with FIGS. 4a to 4d as viewed by themselves can also be regarded as an invention and thus as an extension and improvement of a conventionally constructed SLM according to the prior art, where transistors and data lines are not provided directly under the reflective pixels and a conventional black mask is thus used. Such an SLM already has reflective pixels, as mentioned, with transmissive pixels and reflective pixels being situated or arranged in one and the same plane. That means, therefore, that a conventional SLM provided according to the prior art, as disclosed in FIG. 2, can be provided which is combined with the improvements/extensions and features described in the embodiments according to FIGS. 4a to 4d.

Such an SLM therefore has the following features:

A spatial light modulation device comprising:
pixels, substantially one half of the pixels being designed as reflective and the other half of the pixels as transmissive and the reflective pixels being arranged in alternation with the transmissive pixels in the same substrate plane.
an unstructured retardation element provided in a reflection plane provided in the light propagation direction between the reflective pixels and the transmissive pixels.
at least one transparent substrate and an addressable transmissive layer, which is preferably designed as a liquid crystal layer comprising liquid crystal molecules and which forms the pixels as modulation elements for modulating incident light.
the reflective pixel is designed as a phase pixel and the transmissive pixel is designed as an amplitude pixel.
the reflective pixel has a reflection layer, preferably a mirror element, the reflection layer being provided at the back end of the reflective pixel in the light propagation direction.
the at least one transparent substrate has on one side the addressable transmissive layer with the pixels and on the other, opposite side a plane designed as a reflection plane.
the reflection plane has a mirror system, at which light is reflected between passing through the reflective pixels and the transmissive pixels.
the mirror system has mirror elements which are designed as reflective on the side facing toward the addressable transmissive layer with the pixels.
the mirror elements of the mirror system are arranged relative to the reflective pixels and the transmissive pixels in such a way that each mirror element covers both a part of the reflective pixel and a part of the transmissive pixel.
the addressable transmissive layer is coupled to the reflection plane in such a way that incident light passes through both the reflective pixel and the transmissive pixel of the addressable transmissive layer, the light being reflectable by the intervening reflection plane.
the unstructured retardation element is arranged in the reflection plane and is configured for setting the polarization of the incident light upon passing through a mutually adjacent pair composed of a reflective pixel and a transmissive pixel, which are designed as a phase pixel and an amplitude pixel and together form a complex pixel pair, for the pixel through which the light passes as second pixel of the pixel pair.
the unstructured retardation element is designed as a quarter-wave plate or an eighth-wave plate.
a compensation retardation element, the compensation retardation element being unstructured and being designed as a quarter-wave plate or an eighth-wave plate, the compensation retardation element interacting with the unstructured retardation element in such a way that a required polarization of the light incident on that pixel of the pixel pair which is to be passed through first is present.
the unstructured retardation element and the compensation retardation element have an identical direction of the optical axes or their optical axes are rotated by 90° with respect to one another.
two polarizers, one polarizer being arranged in the region of the light entrance plane of the light modulation device and the other polarizer being arranged in the region of the light exit plane of the light modulation device.
a backplane comprising transistors and data lines for conducting signals to the pixels, each pixel being assigned at least one transistor and at least two data lines, the transistors and the data lines of each mutually adjacent pair composed of a reflective pixel and a transmissive pixel being arranged under the reflective pixel (in the light propagation direction).
the backplane has a black mask assigned to the transistors and to the data lines and configured in such a way that the black mask does not cover the edge region of the aperture of the pixels over the entire extent.
the pixels are designed in rectangular fashion, the aperture of the pixels being restricted at two opposite sides and not being restricted at the other two opposite sides.

Figure 5:
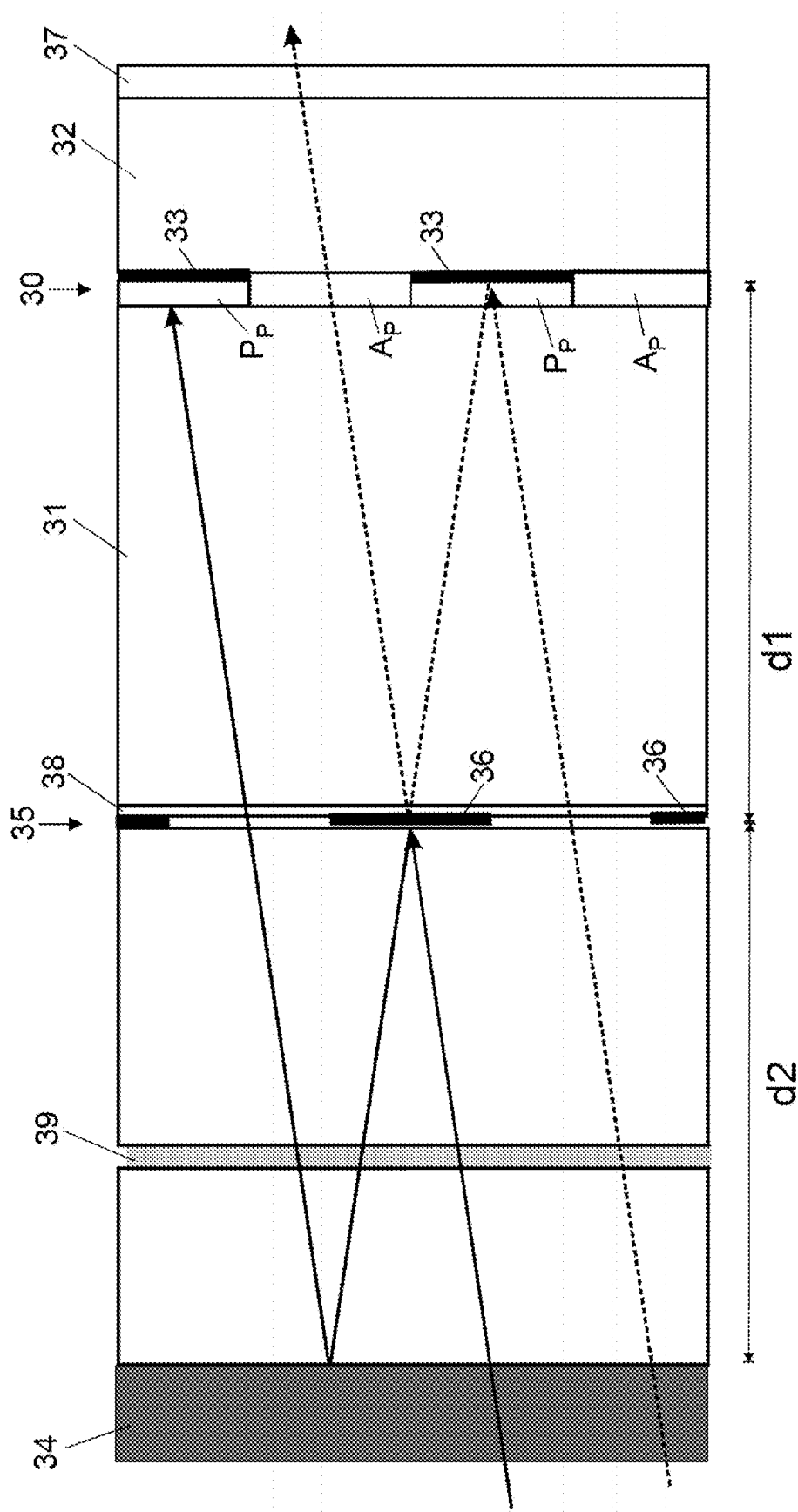
FIG. 5: an outline representation of a further embodiment of the spatial light modulation device according to the invention with the provision of light recycling.

FIG. 5 illustrates an embodiment of an SLM according to FIG. 3 which contributes to increasing the light intensity. Consequently, here, too, transistors and data lines are arranged under the reflective pixels in order to increase the fill factor of the SLM. It goes without saying that for the SLM according to FIG. 5 it is not absolutely necessary for transistors and data lines of a backplane of the SLM to be arranged behind the reflective pixels. Conventional arrangements of the transistors and data lines are likewise possible. FIG. 5 thus shows a configuration of a spatial light modulation device in side view for improving the light efficiency. The basic set-up of the SLM shown here corresponds in principle to the set-up of the SLM according to FIG. 4a.

That is to say that, here too, the SLM has a single addressable transmissive layer 30, here too in the form of a liquid crystal layer, between two substrates 31 and 32. Phase pixels Pp and amplitude pixels Ap are once again provided as complex pixel pair in alternation with one another in one and the same plane of the SLM. Here, too, the phase pixels Pp are designed as reflective and the amplitude pixels Ap as transmissive. In order to enable the reflectivity of the phase pixels Pp, the latter have a reflection layer 33 at their back end or in the back region, under which reflection layer, as described in FIG. 3, transistors and data lines can, but need not, be concealed and arranged.

An illumination device, not illustrated, which here is configured as a backlight device, but can also be configured as a frontlight illumination device, emits collimated light onto the SLM. The collimated light is emitted by the illumination device at a defined illumination angle, e.g. 10°, thus resulting in an oblique illumination of the SLM. In addition, the light incident on the SLM has a defined polarization state, which is produced or furthermore improved by means of a polarizer 34 provided in the region of the light entrance plane of the SLM. As is discernible, the light passes firstly through the phase pixels Pp and then through the amplitude pixels Ap successively in the light propagation direction, where here, too, this could be done in the opposite order. A reflection plane 35 is provided in the light propagation direction between the phase pixels Pp and the amplitude pixels Ap, at which reflection plane the light modulated in terms of phase by the phase pixels Pp is reflected and is reflected in the direction of the amplitude pixels Ap. As described in FIGS. 4a to 4d, the light is incident firstly on the phase pixel Pp of the complex pixel pair, is reflected at its back end of the phase pixel Pp at the reflection layer 33, which can be designed as a mirror element or mirror layer, and once again passes through the phase pixel Pp. The light thus reflected by the phase pixel Pp now propagates to the reflection plane 35 with the mirror system and an unstructured retardation element 38. Mirror elements 36 of the mirror system are designed as reflective on the side or region facing toward the liquid crystal layer 30 with the pixels Pp and Ap and are arranged relative to the reflective and the transmissive pixels, i.e. relative to the phase pixels Pp and the amplitude pixels Ap, such that each mirror element 36 covers both a part of the reflective pixel and a part of the transmissive pixel. After the light has been reflected at the mirror elements 36 of the mirror system and has once again passed through the unstructured retardation element 38, the light altered in terms of its polarization is directed to the transmissive amplitude pixels Ap and correspondingly modulated there in terms of its amplitude, as is intended to be clarified by the dashed beam path of the light in the illustration. The light emanating from the transmissive amplitude pixel Ap is incident on a polarizer 37 provided in the region of the light exit plane of the SLM and is transmitted by said polarizer, if the correct polarization of the light is present.

For the modulation of the light by two pixels of the SLM that are arranged next to one another, the light passing through these pixels successively in the light path, it is necessary to block a certain proportion of the incident light in the region of the light entrance side of the SLM or on the input side, such that light is directed only in the direction of that pixel of the pixel pair which is to be passed through first, preferably the phase pixel, and reaches the second pixel of the pixel pair, e.g. the amplitude pixel, only after passing through the first pixel, e.g. the phase pixel. In an arrangement according to the prior art, e.g. in accordance with US 2016/0327906 A1, this light would be lost, however, which can have a disadvantageous effect on the light efficiency of the SLM.

In order to increase or improve the light efficiency of the SLM, in FIG. 5 provision is made for designing the mirror elements 36 for the reflection of the light in the reflection plane 35 between the amplitude pixel Ap and phase pixel Pp such that not only do they act as mirror element or have a reflective effect on the inner side, i.e. toward the modulating liquid crystal layer 30, but they also reflect the light on the input side or as viewed in the direction of the illumination device. In other words, the mirror elements 36 are designed as reflective on both sides, the side facing toward the liquid crystal layer 30 with the pixels Pp and Ap and the side facing away therefrom. In the region of the light entrance plane of the SLM, moreover, the polarizer 34 is designed as a reflective polarizer, i.e. is designed as transmissive for one defined polarization and as reflective for another defined polarization. The reflective polarizer 34 can be designed for example as a wire grid polarizer (WGP). Furthermore, a compensation retardation element 39 is also provided in this exemplary embodiment in accordance with FIG. 5, and here may also be referred to as a light recycling retardation element or light recycling element. The compensation retardation element 39 or light recycling retardation element 39 or light recycling element 39 is configured in unstructured fashion and arranged in the light direction downstream of the reflective polarizer 34 provided in the region of the light entrance plane of the SLM. In this case, then, in order to increase the light efficiency of the SLM provision is made for choosing the alignment of the optical axis of the compensation retardation element 39 and the optical axis of the reflective polarizer 34 such that light which is incident on the mirror element 36 on the input side, is reflected by said mirror element and is directed or passes back in the direction of the reflective polarizer 34 is rotated with regard to its polarization. At least one portion of the light is thus reflected by the reflective polarizer 34 and directed again in the direction of a first pixel of a pixel pair, here in FIG. 5 a phase pixel Pp, for modulation as illustrated by the black solid arrow. Preferably, the entire light is directed in the direction of the first pixel of the pixel pair by the reflective polarizer 34 for the purpose of further modulation. The compensation retardation element 39 thus performs two tasks here, namely the compensation of the effect of the unstructured retardation element 38, as disclosed with respect to FIGS. 4a to 4d, and the effect as a light recycling element.

By setting the distance d2 between the reflective polarizer 34 and the mirror elements 36 to almost the same value as the thickness d1 of the substrate, here of the first substrate 31, between the mirror elements 36 and the addressable transmissive layer 30, here in the form of a liquid crystal layer, what is achieved is that after the reflection at the reflective polarizer 34 the light arrives at an opening or aperture of a first pixel of a pixel pair and is not incident again on a mirror element 36.

Figure 6:
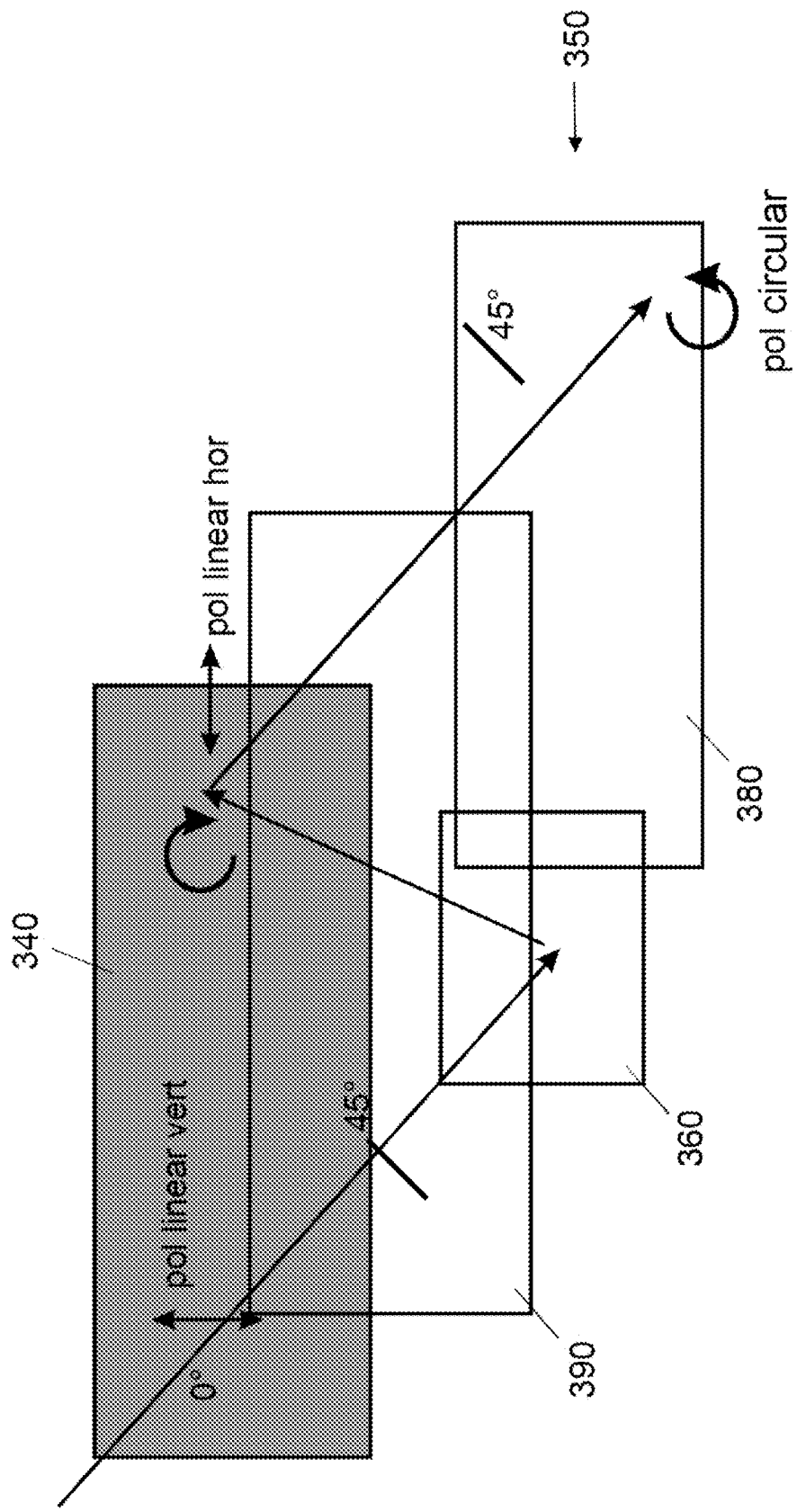
FIG. 6: an outline representation of a spatial light modulation device according to FIG. 5 with provision of an in-plane mode.

An embodiment of an SLM according to FIG. 5 for an in-plane mode of the SLM is illustrated in FIG. 6. For reasons of clarity, however, FIG. 6 shows only the region of the SLM from the reflective polarizer provided in the region of the light entrance plane as far as after the passage of the light through the unstructured retardation element in the reflection plane. A compensation retardation element 390 which is provided in the SLM, and which in this case is unstructured and is designed as an eighth-wave plate and the optical axis of which is arranged at 45°, is simultaneously used also to circularly polarize reflected light from a reflective polarizer 340, the optical axis of which is at 0°, such that circularly polarized light arrives at the phase pixel of a complex pixel pair composed of a reflective pixel and a transmissive pixel, preferably a reflective phase pixel and a transmissive amplitude pixel, and can pass through and be modulated by said phase pixel. That means that after linearly vertically polarized light enters the SLM by means of the reflective polarizer 340, which transmits linearly vertically polarized light and reflects linearly horizontally polarized light, the light is incident on the compensation retardation element 390 designed as an eighth-wave plate. This light is then incident on mirror elements 360 of a mirror system, arranged in a reflection plane 350, and is reflected from said mirror elements through the compensation retardation element 390 back to the reflective polarizer 340. After passing through the compensation retardation element 390 twice, the light is circularly polarized. After reflection of the light at the mirror elements 360 of the mirror system in the reflection plane 350, approximately 50% of this light is then reflected at the reflective polarizer 340, which light is then initially linearly polarized again, namely linearly horizontally polarized, while the other 50% of the light is transmitted by the reflective polarizer 340 and optionally coupled back into the illumination device. After the reflective light has once again passed through the compensation retardation element 390 and the apertures in the reflection plane 350, the light is incident on an unstructured retardation element 380, the optical axis of which is likewise at 45° and which is designed as an eighth-wave plate. The compensation retardation element 390 and the unstructured retardation element 380 jointly act as a quarter-wave plate and convert the horizontally linearly polarized light into right circularly polarized light, such that the light can reach a following phase pixel (not illustrated) in the direction of the illustrated arrow in circularly polarized fashion as required. The further light propagation corresponds to the described light path according to FIG. 5.

An arrangement for increasing the light efficiency is, however, also highly suitable for an SLM whose amplitude pixels and phase pixels modulate the light independently of the polarization thereof. This would be the case for example for electrowetting-based SLMs or multi quantum well-based SLMs. The compensation retardation element 390 can then be designed as a quarter-wave plate with an optical axis at 45° relative to the polarizer 340. Light which is reflected by the mirror elements 360 and passes back through the compensation retardation element 390 to the reflective polarizer 340 is rotated by 90° in terms of its polarization and is completely reflected at the polarizer 340. An unstructured retardation element 380 is not required in this case.

The exemplary embodiments of the invention as disclosed in FIGS. 5 and 6 have been described in connection with FIGS. 3 and 4*a* to 4*d*, i.e. in connection with an SLM in which transistors and data lines are arranged under the reflective pixels. Such a combination of elements is expedient and advantageous. However, it is also possible that the embodiments in accordance with FIGS. 5 and 6 as viewed by themselves can also be regarded as an invention and thus as an extension and improvement of a conventionally constructed SLM according to the prior art, where transistors and data lines are not provided directly under the reflective pixels and a conventional black mask is thus used. Such an SLM already has reflective pixels, as mentioned, with transmissive pixels and reflective pixels being situated or arranged in one and the same plane. That means, therefore, that a conventional SLM provided according to the prior art, as described and shown in FIG. 2, for example, can be provided which is combined with the improvements/extensions and features described in the embodiments according to FIGS. 5 and 6.

Such an SLM therefore has the following features:
A spatial light modulation device comprising:
pixels, substantially one half of the pixels being designed as reflective and the other half of the pixels as transmissive and the reflective pixels being arranged in alternation with the transmissive pixels in the same substrate plane.
a compensation retardation element or light recycling retardation element or light recycling element, the compensation retardation element being unstructured and being designed as a quarter-wave plate or an eighth-wave plate.
a polarizer provided in the region of the light entrance plane of the light modulation device, the polarizer being designed as reflective and preferably as a wire grid polarizer.
a further polarizer, this polarizer being provided in the region of the light exit plane of the light modulation device.
at least one transparent substrate and an addressable transmissive layer, which is preferably designed as a liquid crystal layer comprising liquid crystal molecules and which forms the pixels as modulation elements for modulating incident light.
the reflective pixel is designed as a phase pixel and the transmissive pixel is designed as an amplitude pixel.
the reflective pixel has a reflection layer, preferably a mirror element, the reflection layer being provided at the back end of the reflective pixel in the light propagation direction.
the at least one transparent substrate has on one side the addressable transmissive layer with the pixels and on the other, opposite side a plane designed as a reflection plane.
the reflection plane has a mirror system, at which light is reflected between passing through the reflective pixels and the transmissive pixels.
the mirror system has mirror elements which are designed as reflective on both sides, the side facing toward the addressable transmissive layer with the pixels and the side facing away therefrom.
the mirror elements of the mirror system are arranged relative to the reflective pixels and the transmissive pixels in such a way that each mirror element covers both a part of the reflective pixel and a part of the transmissive pixel.
the addressable transmissive layer is coupled to the reflection plane in such a way that incident light passes through both the reflective pixel and the transmissive pixel of the addressable transmissive layer, the light being reflectable by the intervening reflection plane.
the distance between the polarizer provided in the region of the light entrance plane of the light modulation device and the mirror elements of the mirror system in the reflection plane is set to the same value as the thickness of the at least one substrate between the mirror elements of the mirror system and the addressable transmissive layer with the pixels.
a backplane comprising transistors and data lines for conducting signals to the pixels, each pixel being assigned at least one transistor and at least two data lines, the transistors and the data lines of each mutually adjacent pair composed of a reflective pixel and a transmissive pixel being arranged under the reflective pixel (in the light propagation direction).
the backplane has a black mask assigned to the transistors and to the data lines and configured in such a way that the black mask does not cover the edge region of the aperture of the pixels over the entire extent.
the pixels are designed in rectangular fashion, the aperture of the pixels being restricted at two opposite sides and not being restricted at the other two opposite sides.
an unstructured retardation element provided in a reflection plane provided in the light propagation direction between the reflective pixels and the transmissive pixels.
the unstructured retardation element is arranged in the reflection plane and is configured for setting the polarization of the incident light upon passing through a mutually adjacent pair composed of a reflective pixel and a transmissive pixel, which are designed as a phase pixel and an amplitude pixel and together form a complex pixel pair, for the pixel through which the light passes as second pixel of the pixel pair.

the unstructured retardation element is designed as a quarter-wave plate or an eighth-wave plate.

Figure 7:
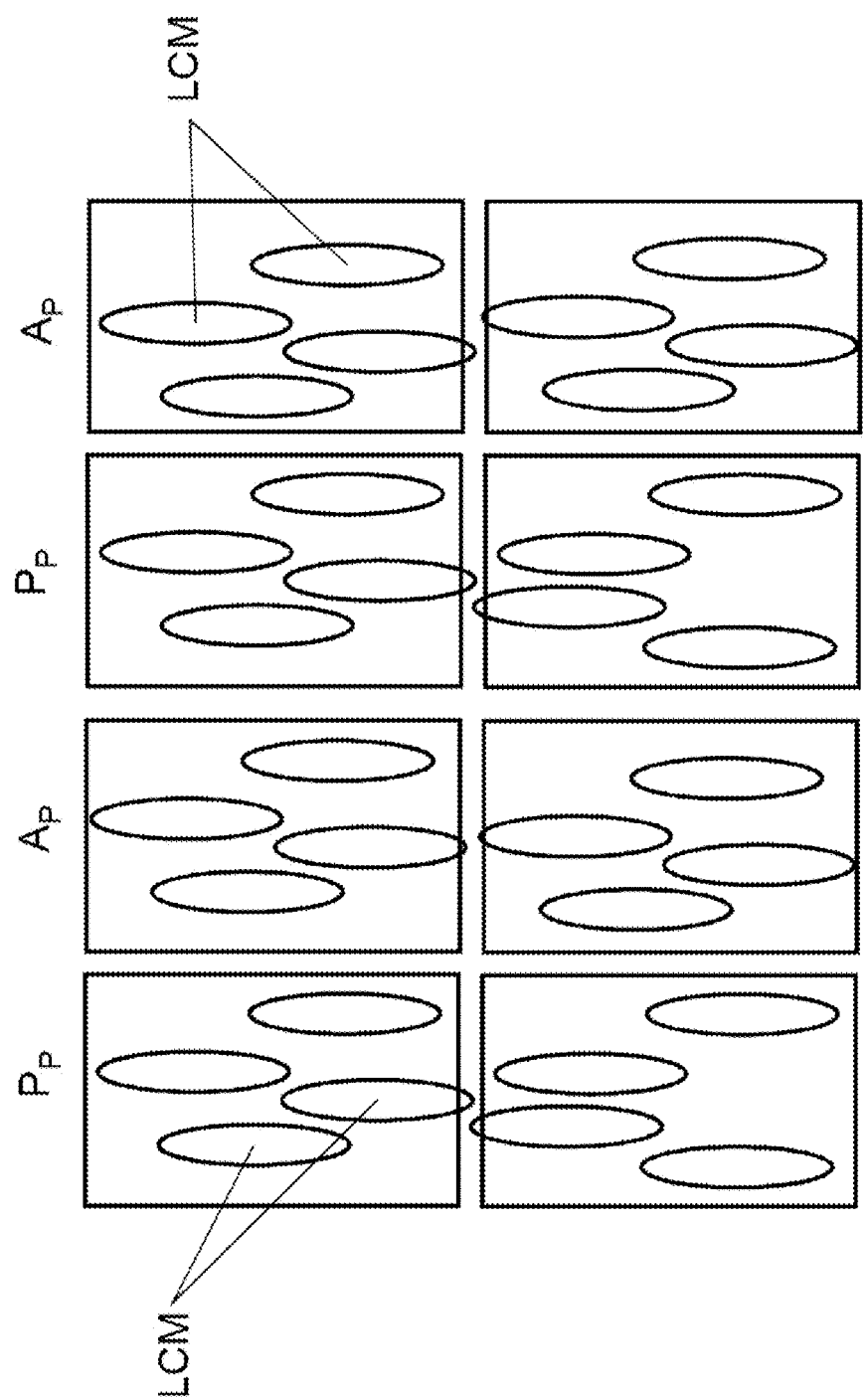
FIG. 7: a schematic illustration of a pixel arrangement of a spatial light modulation device with provision of an unstructured alignment of the liquid crystal molecules.

A further embodiment of an SLM is shown in FIG. 7. In this exemplary embodiment, an unstructured alignment, i.e. of the orientation of the liquid crystal molecules, of amplitude pixels and phase pixels in accordance with the prior art is used in the SLM. FIG. 7 thus shows a pixel arrangement of an SLM in which an unstructured alignment of liquid crystal molecules LCM is shown in top view. Such an unstructured alignment of the liquid crystal molecules LCM is possible both in the ECB mode and in in-plane modes of the SLM. As is discernible, in this pixel arrangement, too, phase pixels Pp and amplitude pixels Ap are arranged next to one another in the same plane. The liquid crystal molecules LCM of the phase pixels Pp are aligned in the same way as or just like the liquid crystal molecules LCM of the amplitude pixels Ap. Here the molecule longitudinal axes of the liquid crystal molecules LCM all point in the same direction, both those of the phase pixels Pp and those of the amplitude pixels Ap.

Figure 8:
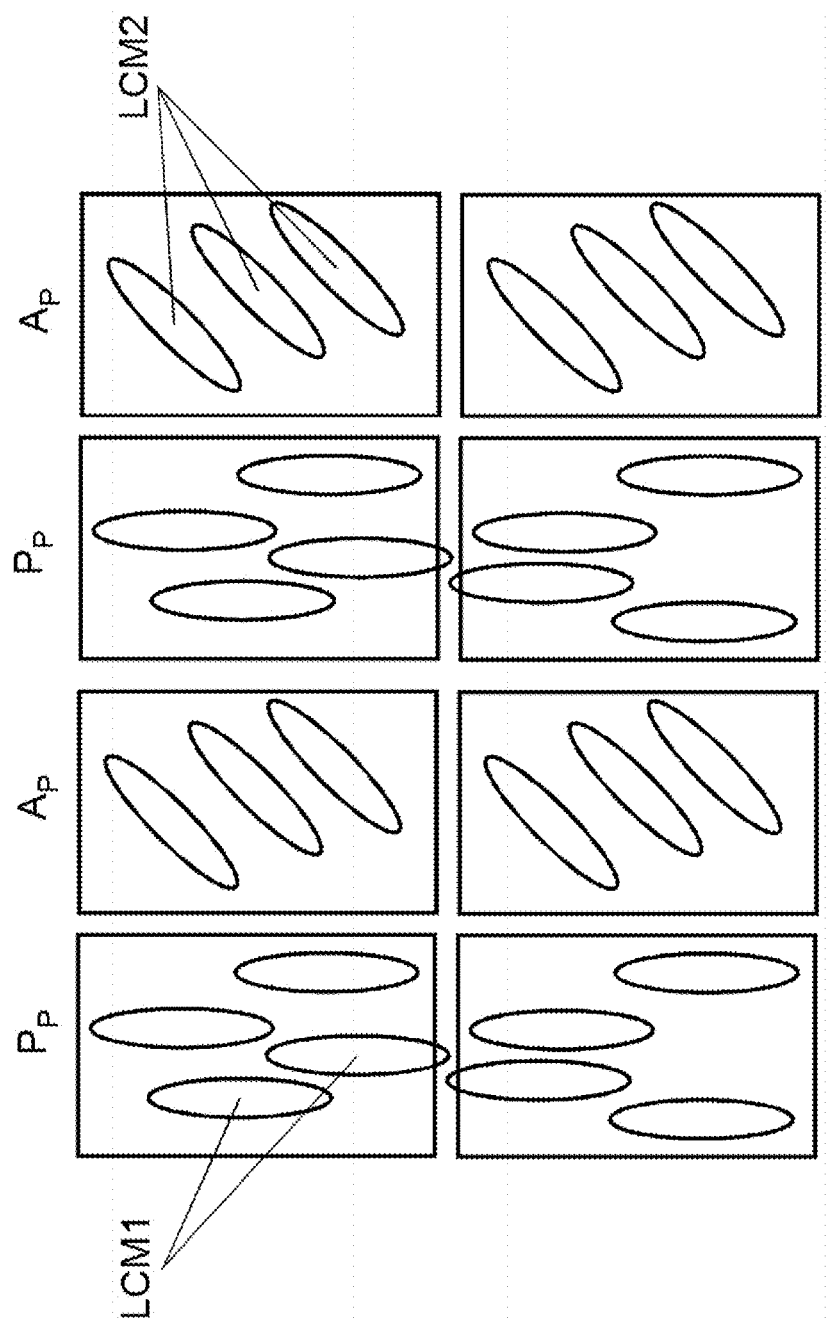
FIG. 8: a schematic illustration of a pixel arrangement of a spatial light modulation device with provision of a structured alignment of the liquid crystal molecules.

In order to simplify the set-up of an SLM, however, an exemplary embodiment of an SLM which provides a structured alignment of the liquid crystal molecules LCM of the phase pixels Pp and amplitude pixels Ap is provided in accordance with FIG. 8. FIG. 8 shows this in top view. In this case, provision is made for arranging, by means of photoalignment, the liquid crystal molecules LCM2 in the amplitude pixels Ap in a manner rotated by 45° in comparison with the liquid crystal molecules LCM1 in the phase pixels Pp. This has the advantage in the case of the ECB mode and similar liquid crystal modes, for example, that the polarization of the light between the phase pixels Pp and the amplitude pixels Ap either need not be rotated at all or can be rotated by 90°.

In the first case, in which no rotation of the polarization of the light is provided, the need for an unstructured or even structured retardation element provided in the beam path between the phase pixels and the amplitude pixels, as in FIGS. 4a to 6, can thus be obviated. In the second case above, in which the polarization of the light is rotated by 90°, it is possible to provide an unstructured retardation element, as in FIGS. 4a to 6, which is preferably designed as a quarter-wave plate, the optical axis of which is set to approximately 45°.

Such a structured alignment of the liquid crystal molecules LCM in the pixels of the SLM in accordance with FIG. 8 can be provided in order to reduce crosstalk between the adjacent pixels of the addressable transmissive layer of the SLM. This is because the light is diffracted at the apertures of the SLM, thus giving rise to diffraction effects which disadvantageously result in this diffracted light not only being incident on the first pixel to be passed through, preferably the phase pixel, of a complex pixel pair in the same plane of the SLM, but also being incident on the second pixel, preferably the amplitude pixel, arranged next to the first pixel. As a result, the light incident on the second pixel of the pixel pair has only a modulation of this type of pixel before it emerges from the SLM, that is to say, for example, that the light is incident only on the amplitude pixel, and so it is modulated only in terms of its amplitude and it leaves the SLM without a phase modulation. In order to counteract that, a polarizer provided in the region of the light exit plane of the SLM can be provided. This polarizer requires a specific setting, however, such that the light modulated only by the second pixel is virtually not or not transmitted or allowed to pass by the SLM.

If the ECB mode is used in the SLM, for example, where the polarization of the light between the phase pixels and the amplitude pixels is rotated by 45° and the amplitude pixels require a polarizer provided in the region of the light exit plane of the SLM, said polarizer being parallel or perpendicular to the polarization of the light incident on the SLM, then the polarizer on the output side or provided in the region of the light exit plane of the SLM must also be rotated by 45° relative to the polarization incident on the first pixel of a pixel pair, e.g. the phase pixel. If, then, as a result of diffraction, light is incident directly on the adjoining second pixel of the pixel pair, e.g. the amplitude pixel, owing to its incorrect polarization its amplitude is not even modulated in the first place, rather said light passes through the amplitude pixel as second pixel and is incident on the output-side polarizer provided in the region of the light exit plane of the SLM. The polarizer provided in the region of the light exit plane of the SLM absorbs and filters approximately 50% of this light, but the other 50% of this light can pass through this polarizer. The output-side polarizer thus filters only partly, but not completely, the unwanted light incident on the second pixel of the pixel pair. By contrast, the filtering of 50% of the diffracted light is effected equally for all pixels of the SLM independently of the set amplitude value and phase value.

If, however, as disclosed and described above, use is made of structured alignment of the liquid crystals in the amplitude pixels and phase pixels of an SLM, where the orientation of the liquid crystal molecules in the amplitude pixels is rotated by 45° relative to the orientation of the liquid crystal molecules in the phase pixels, as illustrated in FIG. 8, then it is possible that the polarization of the light between the phase pixels and the amplitude pixels need not be rotated. That means that no structured or unstructured retardation element for rotating the polarization of the light need be provided in the SLM. A polarizer provided in the region of the light exit plane of the SLM is provided in a manner rotated by 90° relative to the polarization with which light is incident on the phase pixels. In this case, light which, as a result of diffraction at openings of the SLM, is incident directly on a second pixel of a complex pixel pair, e.g. an amplitude pixel adjoining the phase pixel, would also be amplitude-modulated, however, since the orientation of the liquid crystal molecules in the second pixel is present in a manner rotated by 45° with respect to the orientation of the liquid crystal molecules in the first pixel to be passed through in the pixel pair. However, this light is then not phase-modulated. The proportion of the light transmitted by the polarizer provided in the region of the light exit plane of the SLM is thus proportional to the amplitude of the pixel.

This described configuration of the SLM is particularly advantageous because crosstalk between the pixels of the addressable transmissive layer of the SLM as a result of diffraction of the light cannot have a disturbing effect on the contrast of the SLM in this case. Pixels which are designed as a complex pixel pair and in the case of which the amplitude value is equal to zero (0) also maintain the amplitude 0 despite diffraction or do not transmit light because the diffracted light is completely filtered out for these pixels.

Figure 9:
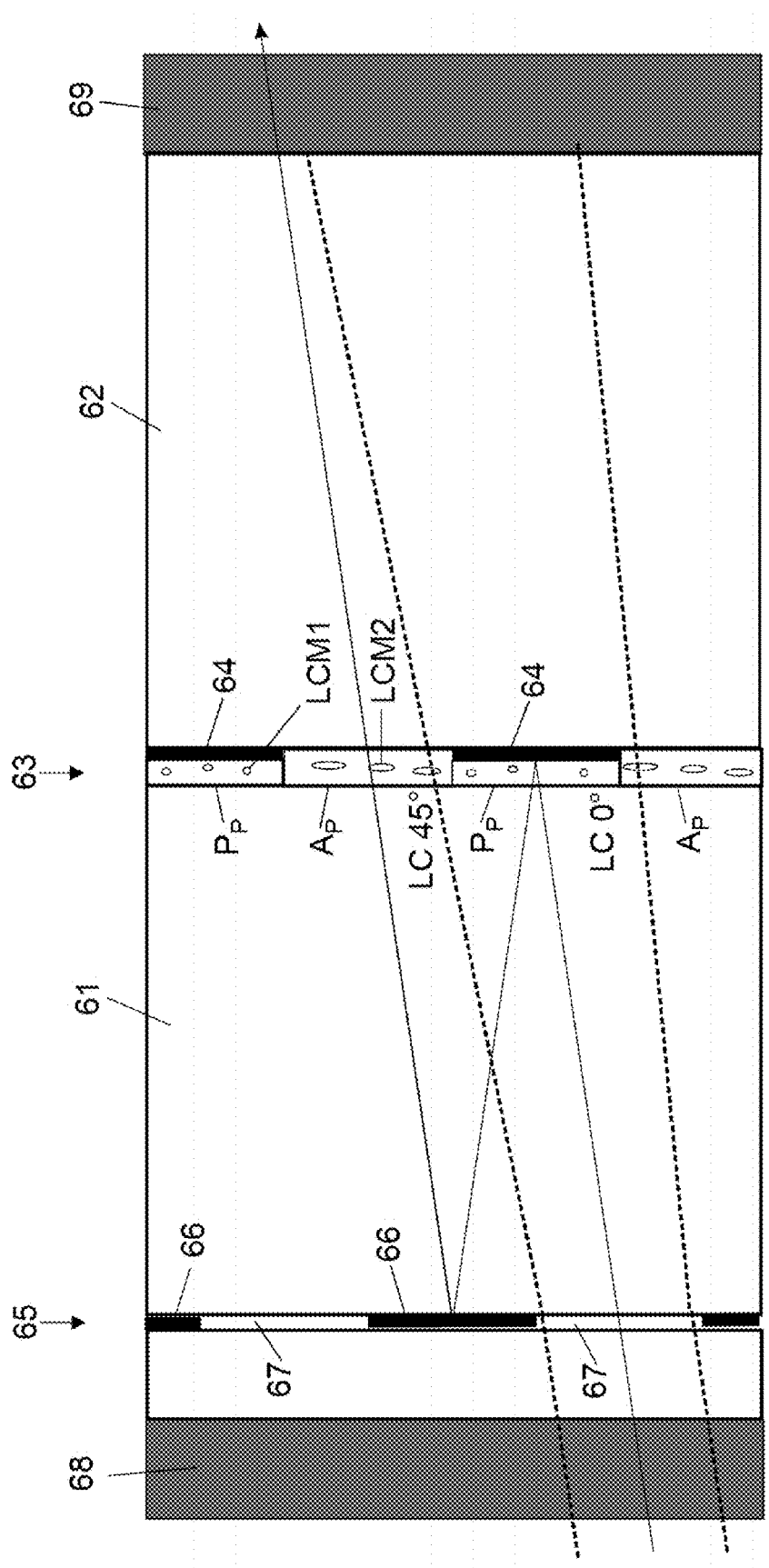
FIG. 9: an outline representation of a further configuration of the spatial light modulation device according to the invention for reducing crosstalk between adjoining pixels.

FIG. 9 shows such an embodiment of an SLM in which the wanted light path, i.e. the reflection of the incident light at the first pixel of a complex pixel pair and at the mirror element of a mirror system in a reflection plane, completely passes through a polarizer provided in the region of the light exit plane of the SLM, while light which, on account of diffraction at an input of the SLM, i.e. in the plane of the mirror elements, is not incident on the first pixel of the pixel pair and passes directly through a second pixel of the pixel pair is then filtered depending on the amplitude value of the light at the polarizer on the output side or provided in the region of the light exit plane of the SLM.

As is discernible in FIG. 9, the SLM has a first substrate 61 and a second substrate 62, between which an addressable transmissive layer 63, preferably a liquid crystal layer, is embedded. Here, too, the addressable transmissive layer 63 has reflective pixels and transmissive pixels, the reflective pixels preferably being the phase pixels Pp and the transmissive pixels preferably being the amplitude pixels Ap. The reflective pixels or the phase pixels Pp have a reflection layer 64 at their back end, the incident light being reflected at said reflection layer. The latter can be designed as a mirror element. Transistors and data lines of a backplane can be arranged behind or under said reflection layer 64 in order to enlarge the aperture of the pixels and to increase the fill factor of the SLM. This is not absolutely necessary, however, such that the transistors and the data lines of the backplane can also be arranged and provided in a conventional manner with respect to the addressable transmissive layer 63. A reflection plane 65 is provided in the light direction between the phase pixels Pp and the amplitude pixels Ap, which here, too, are arranged in alternation with one another and in a manner adjoining one another in one and the same plane, a phase pixel Pp and an amplitude pixel Ap forming a complex pixel pair. A mirror system comprising mirror elements 66 is provided in the reflection plane, at which mirror elements the light reflected by the phase pixel Pp is incident, is reflected and is directed in the direction of the transmissive amplitude pixel Ap. This procedure corresponds in principle to the light path in accordance with FIG. 4a.

In order, then, to reduce or to avoid crosstalk between adjacent pixels, for example between a phase pixel Pp and an adjoining amplitude pixel Ap, as disclosed in FIG. 8 and FIG. 9, liquid crystal molecules LCM2 of the amplitude pixels Ap are oriented in a manner rotated by 45° with respect to the liquid crystal molecules LCM1 of the phase pixels Pp. This is evident from the different orientation or representation of the liquid crystal molecules LCM1 and LCM2 in FIG. 9. The light polarized by a polarizer 68 provided in the region of a light entrance plane of the SLM or the light furthermore improved in terms of its degree of polarization passes through an aperture 67 present in the reflection plane 63 and is incident on the phase pixel Pp for modulation of the phase, as illustrated by the black solid arrow, is reflected at the reflection layer 64 and is directed further to the reflection plane 65, at which it is likewise reflected at the mirror elements 66 and then steered in the direction of the amplitude pixel Ap. There the light, as described with respect to FIG. 4a, is amplitude-modulated and passes through a polarizer 69 on the output side or provided in the region of a light exit plane of the SLM and then emerges from the SLM. At the aperture 67, however, incident light is also diffracted, such that this diffracted light portion in part is not incident on the phase pixel Pp, but rather on pixels adjoining the phase pixel Pp, namely on amplitude pixels Ap, as is illustrated by the dashed arrows in FIG. 9. This light incident on the adjoining pixels, here the amplitude pixels Ap, is amplitude-modulated, but not phase-modulated, and after passing through the second substrate 62 is incident on the polarizer 69 provided in the region of a light exit plane of the SLM. This light is then filtered or completely absorbed by said polarizer 69 depending on the amplitude value, such that this light does not leave the SLM or does not emerge from the SLM.

The use of color filters of the primary colors RGB (red, green, blue) can additionally be used for reducing the crosstalk between adjacent pixels in an SLM as a result of diffraction. In this case, color filters are assigned to the pixels of the SLM, in which case for example a respective pixel is subdivided into three subpixels and a red color filter, a green color filter and a blue color filter are assigned to the three subpixels. This is repeated alternately in the pixel arrangement in the sense that an amplitude pixel and a phase pixel in each case have a color filter of the same color, but adjacent pairs of amplitude pixels and phase pixels have color filters of a different color. If the SLM is then illuminated with a specific wavelength, light passing through adjacent pixels with a different assigned color filter not corresponding to the present wavelength is blocked by their color filters. This prevents for example a situation in which light which is intended to be incident firstly on a phase pixel and then on an amplitude pixel of the same pixel pair passes through an adjacent amplitude pixel on account of diffraction.

The exemplary embodiments of the invention as disclosed in FIGS. 8 and 9 have been described in connection with FIGS. 3 and/or 4a to 4d, i.e. in connection with an SLM in which transistors and data lines are arranged under the reflective pixels. Such a combination of elements, in particular in combination with the features in accordance with FIG. 3, is particularly expedient and advantageous. However, it is also possible that the embodiments in accordance with FIGS. 8 and 9 as viewed by themselves can also be regarded as an invention and thus as an extension and improvement of a conventionally constructed SLM according to the prior art, where transistors and data lines are not provided directly under the reflective pixels and a conventional black mask is thus used. Such an SLM already has reflective pixels, as mentioned, with transmissive pixels and reflective pixels being situated or arranged in one and the same plane. That means, therefore, that a conventional SLM provided according to the prior art, as described and illustrated e.g. in FIG. 2, can be provided which is combined with the improvements/extensions and features described in the embodiments according to FIGS. 8 and 9.

Such an SLM therefore has the following features:

A spatial light modulation device comprising:
pixels, substantially one half of the pixels being designed as reflective and the other half of the pixels as transmissive and the reflective pixels being arranged in alternation with the transmissive pixels in the same substrate plane.
the orientation of liquid crystal molecules of the pixels is settable in such a way that an orientation of the liquid crystal molecules of the transmissive pixels rotated by 45° with respect to an orientation of the liquid crystal molecules of the reflective pixels is present.
a polarizer provided in the region of the light exit plane of the light modulation device and having a polarization direction which is rotated by 90° with respect to the polarization direction of the light which is incident on the first pixel of the pixel pair composed of a reflective pixel and a transmissive pixel when passing through the pixel pair.
unwanted diffracted light which is incident in each case on pixels adjoining a pixel that is to modulate the light is filterable by the polarizer provided in the region of the light exit plane of the light modulation device.

the unwanted diffracted light which is incident in each case on pixels adjoining a pixel that is to modulate the light is filterable by the polarizer provided in the region of the light exit plane of the light modulation device depending on the amplitude value of the adjoining pixel.

a further polarizer, this polarizer being provided in the region of the light entrance plane of the light modulation device.

at least one transparent substrate and an addressable transmissive layer, which is preferably designed as a liquid crystal layer comprising liquid crystal molecules and which forms the pixels as modulation elements for modulating incident light.

the reflective pixel is designed as a phase pixel and the transmissive pixel is designed as an amplitude pixel.

the reflective pixel has a reflection layer, preferably a mirror element, the reflection layer being provided at the back end of the reflective pixel in the light propagation direction.

the at least one transparent substrate has on one side the addressable transmissive layer with the pixels and on the other, opposite side a plane designed as a reflection plane.

the reflection plane has a mirror system, at which light is reflected between passing through the reflective pixels and the transmissive pixels.

the mirror system has mirror elements which are designed as reflective on the side facing toward the addressable transmissive layer with the pixels.

the mirror elements of the mirror system are arranged relative to the reflective pixels and the transmissive pixels in such a way that each mirror element covers both a part of the reflective pixel and a part of the transmissive pixel.

the addressable transmissive layer is coupled to the reflection plane in such a way that incident light passes through both the reflective pixel and the transmissive pixel of the addressable transmissive layer, the light being reflectable by the intervening reflection plane.

a backplane comprising transistors and data lines for conducting signals to the pixels, each pixel being assigned at least one transistor and at least two data lines, the transistors and the data lines of each mutually adjacent pair composed of a reflective pixel and a transmissive pixel being arranged under the reflective pixel (in the light propagation direction).

the backplane has a black mask assigned to the transistors and to the data lines and configured in such a way that the black mask does not cover the edge region of the aperture of the pixels over the entire extent.

the pixels are designed in rectangular fashion, the aperture of the pixels being restricted at two opposite sides and not being restricted at the other two opposite sides.

An SLM disclosed and illustrated in FIGS. 3 to 9 can be used in a display device for representing two-dimensional and/or three-dimensional objects or scenes. Such a display device is shown in FIG. 10.

One preferred configuration of the display device according to the invention is described in FIG. 10. This display device can be used for example with the ECB mode of the liquid crystals or else in the case in which the SLM is operated in the in-plane mode. As an addressable transparent layer 80 comprising the complex-valued pixels as pixel pairs composed of a phase pixel Pp and an amplitude pixel Ap, use is preferably made of a liquid crystal layer in the SLM. Besides the SLM, the display device has an illumination device 81, here in the form of a backlight device, which generates light by means of at least one light source and emits it onto the SLM. Polarized light is required for the SLM, the polarization state of which light is settable e.g. already in the illumination device 81 or by means of a polarizer 82, provided for example in the region of the light entrance plane of the SLM. As is evident in FIG. 10, linearly polarized light enters the SLM, which is formed in a sandwich-like manner from the addressable transmissive layer 80 and a reflection plane 83, which is provided between the polarizer 82 and the addressable transmissive layer 80 and which together with the polarizer 82 forms the light entrance plane of the SLM. Between the addressable transmissive layer 80 and the reflection plane 83 and between the addressable transmissive layer 80 and a polarizer 84 provided in the light exit region of the SLM, provision is made of a respective transmissive substrate 85 and 86 as spacer. When the ECB mode is used in the addressable transmissive layer 80, the phase pixel Pp on which the light is incident as first pixel of the complex pixel pair after entering the SLM alters the phase of the light, without altering the polarization state of the light. That is attributable to the orientation of the liquid crystals in the addressable transmissive layer 80.

The light incident on the phase pixel Pp is reflected by means of a reflection layer 87 at the back end of the phase pixel Pp, passes once again through the phase pixel and is directed back in the direction of the illumination device 81. In this way, said light is incident on the reflection plane 83 having a mirror system comprising mirror elements 88 and an unstructured retardation element 89, which introduce a defined retardation. The light is reflected by means of the mirror element 88 and is converted, by means of the unstructured retardation element 89, into linearly polarized light rotated by 45° for the following amplitude pixel Ap as second pixel of the complex pixel pair. After the incidence of the light on the amplitude pixel Ap, said light is amplitude-modulated and emerges from the SLM through the polarizer 84 provided in the light exit plane of the SLM. After passing through the SLM, the light propagates in the direction of a field lens 89, which can be for example a volume grating or a stack of volume gratings or polarization gratings. The field lens 89, which can be in particular a combined field lens which can have at least one volume grating, focuses the light that has emerged from the SLM, i.e. the light modulated with the information of an object or scene to be represented, onto a focal plane in a viewer area. The field lens 89 substantially provides a virtual viewing window VW at the entrance plane of an eye 90 of an observer, through which the observer can observe the represented scene or the represented object. Vertical tracking and/or horizontal tracking of the light, in the event of movement of the eye and/or in the event of the observer moving to a different position, can be provided using a vertical tracking device 91 and/or a horizontal tracking device 92. The tracking devices 91 and 92 can preferably comprise liquid crystal gratings.

If the light emerges from the SLM at an oblique angle of appropriate magnitude, e.g. approximately 30°, then an off-axis volume grating-based field lens can be used. That means that an additional volume grating arranged upstream of the field lens is not required. That is the case only if a combined field lens, as mentioned above, is used. A combined volume grating field lens has a first volume grating, which realizes a plane-to-plane reconstruction, which can be e.g. an obliquely passing plane light wave of 0° degrees (on axis) to 30° degrees. A second volume grating has a reconstruction of a plane light wave of 30° degrees relative to an on-axis field lens. The combination of these two volume gratings forms an on-axis volume grating field lens, referred to as a combined field lens.

A multiplicity of liquid crystal modes can be used in the display device, such as e.g. TN (Twisted Nematic) modes or in-plane modes, whereby a rotation of the liquid crystals in a plane is realized, such as e.g. the HAN mode.

The SLM or the spatial light modulation device according to the invention can be designed for example as a liquid crystal (LC)-based spatial light modulation device or a multi quantum well (MQW)-based spatial light modulation device.

The invention is not intended to be restricted to the exemplary embodiments illustrated here. Moreover, further embodiments or exemplary embodiments and combinations of the exemplary embodiments described, in so far as possible, are possible. Finally, it should also especially be pointed out that the exemplary embodiments described above serve merely for describing the claimed teaching, but the latter is not intended to be restricted to the exemplary embodiments.

The invention claimed is:

1. A light modulation device, comprising
pixels, substantially one half of the pixels being designed as reflective and the other half of the pixels as transmissive and the reflective pixels being arranged in alternation with the transmissive pixels in a same substrate plane,
a backplane comprising transistors and data lines for conducting signals to the pixels, each pixel being assigned at least one transistor and at least two data lines, the transistors and the data lines of each mutually adjacent pair composed of a reflective pixel and a transmissive pixel being arranged under the reflective pixel,
two polarizers are provided, one polarizer being arranged in a region of a light entrance plane of the light modulation device and the other polarizer being arranged in a region of a light exit plane of the light modulation device,
the polarizer provided in the region of the light entrance plane of the light modulation device is configured as transmissive for one defined polarization and as reflective for another defined polarization, and
a distance between the polarizer provided in the region of the light entrance plane of the light modulation device and mirror elements of a mirror system in a reflection plane is set to a same value as a thickness of at least one substrate between the mirror elements of the mirror system and an addressable transmissive layer with the pixels.

2. The light modulation device as claimed in claim 1, wherein at least one transparent substrate and an addressable transmissive layer, which forms the pixels as modulation elements for modulating incident light, are provided.

3. The light modulation device as claimed in claim 2, wherein the addressable transparent layer is designed as a liquid crystal layer comprising liquid crystal molecules.

4. The light modulation device as claimed in claim 2, wherein the at least one transparent substrate has on one side the addressable transmissive layer with the pixels and on the other, opposite side a plane designed as a reflection plane.

5. The light modulation device as claimed in claim 4, wherein the reflection plane comprises a mirror system, at which light is reflected between passing through the reflective pixels and the transmissive pixels.

6. The light modulation device as claimed in claim 5, wherein the mirror system comprises mirror elements which are designed as reflective on a side facing toward the addressable transmissive layer with the pixels or which are designed as reflective on both sides, the side facing toward the addressable transmissive layer with the pixels and a side facing away therefrom.

7. The light modulation device as claimed in claim 6, wherein the mirror elements of the mirror system are arranged relative to the reflective pixels and the transmissive pixels in such a way that each mirror element covers both a part of the reflective pixel and a part of the transmissive pixel.

8. The light modulation device as claimed in claim 2, wherein the addressable transmissive layer is coupled to a reflection plane in such a way that incident light passes through both the reflective pixel and the transmissive pixel of the addressable transmissive layer, the light being reflectable by an intervening reflection plane.

9. The light modulation device as claimed in claim 1, wherein the reflective pixel is designed as a phase pixel and the transmissive pixel is designed as an amplitude pixel.

10. The light modulation device as claimed in claim 1, wherein the reflective pixel has a reflection layer, the reflection layer being provided at a back end of the reflective pixel in a light propagation direction.

11. The light modulation device as claimed in claim 1, wherein the backplane has a black mask assigned to the transistors and to the data lines and configured in such a way that the black mask does not cover an edge region of an aperture of the pixels over an entire extent.

12. The light modulation device as claimed in claim 11, wherein the pixels are designed in rectangular fashion, the aperture of the pixels being restricted at two opposite sides and not being restricted at the other two opposite sides.

13. The light modulation device as claimed in claim 1, wherein an unstructured retardation element is provided.

14. The light modulation device as claimed in claim 13, wherein the unstructured retardation element is arranged in a reflection plane and is configured for setting a polarization of incident light upon passing through a mutually adjacent pair composed of a reflective pixel and a transmissive pixel, which are designed as a phase pixel and an amplitude pixel and together form a complex pixel pair, for the pixel through which the light passes as second pixel of the pixel pair.

15. The light modulation device as claimed in claim 13, wherein the unstructured retardation element is designed as a quarter-wave plate or an eighth-wave plate.

16. The light modulation device as claimed in claim 1, wherein a compensation retardation element is provided.

17. The light modulation device as claimed in claim 16, wherein the compensation retardation element is unstructured and is designed as a quarter-wave plate or an eighth-wave plate, the compensation retardation element interacting with an unstructured retardation element in such a way that a required polarization of light incident on a pixel of a pixel pair which is to be passed through first is present.

18. The light modulation device as claimed in claim 16, wherein an unstructured retardation element and the compensation retardation element have an identical direction of optical axes or optical axes are rotated by 90° with respect to one another.

19. The light modulation device as claimed in claim 1, wherein an orientation of liquid crystal molecules of the pixels is settable in such a way that an orientation of the liquid crystal molecules of the transmissive pixels rotated by 45° with respect to an orientation of the liquid crystal molecules of the reflective pixels is present.

20. The light modulation device as claimed in claim 1, wherein the polarizer provided in the region of the light exit plane of the light modulation device has a polarization direction which is rotated by 90° with respect to a polarization direction of light which is incident on a first pixel of a pixel pair composed of a reflective pixel and a transmissive pixel when passing through the pixel pair.

21. The light modulation device as claimed in claim 20, wherein unwanted diffracted light which is incident on pixels adjoining a pixel that is to modulate the light is filterable by the polarizer provided in the region of the light exit plane of the light modulation device.

22. The light modulation device as claimed in claim 21, wherein the unwanted diffracted light which is incident on pixels adjoining a pixel that is to modulate the light is filterable by the polarizer provided in the region of the light exit plane of the light modulation device depending on an amplitude value of an adjoining pixel.

23. The light modulation device as claimed in claim 1, wherein a color filter arrangement is provided, having color filters of primary colors RGB, individual color filters being assigned to the pixels alternately.

24. The light modulation device as claimed in claim 23, wherein the individual color filters are assigned to the pixels in such a way that a complex pixel pair composed of a reflective pixel and a transmissive pixel has a color filter of same color, and adjacent complex pixel pairs composed of a reflective pixel and a transmissive pixel have a color filter of a different color.

25. The light modulation device as claimed in claim 1, wherein a configuration as a liquid crystal (LC)-based spatial light modulation device, or a multi quantum well (MQW)-based spatial light modulation device.

26. A display device comprising an illumination device and a spatial light modulation device as claimed in claim 1.

27. The display device as claimed in claim 26, wherein the illumination device provides an oblique illumination of the light modulation device.

28. The display device as claimed in claim 26, wherein a field lens is provided, the field lens being designed as a single component or as a combined field lens.

29. The display device as claimed in claim 28, wherein the combined field lens comprises at least one volume grating.

30. The display device as claimed in claim 26, wherein at least one tracking device is provided.

31. The display device as claimed in claim 30, wherein the at least one tracking device comprises at least one liquid crystal grating and/or at least one mirror element.

* * * * *